United States Patent
Jin

(10) Patent No.: US 10,433,324 B2
(45) Date of Patent: Oct. 1, 2019

(54) METHOD AND APPARATUS FOR ALLOCATING RESOURCE IN WIRELESS COMMUNICATION SYSTEM

(71) Applicant: Samsung Electronics Co., Ltd., Suwon-si, Gyeonggi-do (KR)

(72) Inventor: Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 179 days.

(21) Appl. No.: 15/669,302

(22) Filed: Aug. 4, 2017

(65) Prior Publication Data

US 2018/0042037 A1 Feb. 8, 2018

(51) Int. Cl.
*H04W 72/12* (2009.01)
*H04W 72/04* (2009.01)
(Continued)

(52) U.S. Cl.
CPC ... *H04W 72/1236* (2013.01); *H04W 72/0406* (2013.01); *H04W 72/048* (2013.01);
(Continued)

(58) Field of Classification Search
CPC ......... H04W 72/1236; H04W 72/0406; H04W 72/048; H04W 72/121; H04B 7/0417; H04B 7/0621
See application file for complete search history.

(56) References Cited

U.S. PATENT DOCUMENTS 6,321,092 B1 * 11/2001 Fitch .................. G01S 5/12
455/456.5
6,609,004 B1 * 8/2003 Morse .................. G01S 5/0027
455/456.5
(Continued)

FOREIGN PATENT DOCUMENTS

| EP | 3 054 733 A1 | 8/2016 |
| KR | 10-2015-0004256 A | 1/2015 |
| WO | 2015/050394 A1 | 4/2015 |

OTHER PUBLICATIONS

CATR, Resource Allocation and Selection Enhancement for V2V Communications, 3GPP TSG RAN WG1 Meeting #84bis, Apr. 11-15, 2016, R1-163128, Busan, Korea.
(Continued)

*Primary Examiner* — Ian N Moore
*Assistant Examiner* — Latresa A McCallum
(74) *Attorney, Agent, or Firm* — Jefferson IP Law, LLP

(57) ABSTRACT

A communication method and a system for converging a 5th-generation (5G) communication system for supporting higher data rates beyond a 4th-generation (4G) system with a technology for internet of things (IoT) are provided. The present disclosure may be applied to intelligent services based on the 5G communication technology and the IoT-related technology, such as smart home, smart building, smart city, smart car, connected car, health care, digital education, smart retail, security and safety services. A method for allocating resources and a method of a base (Continued)

station is provided. The method includes receiving from a terminal a resource allocation request, receiving from the terminal a control message including location information of a zone where the terminal is located, and allocating a resource group based on the location information.

16 Claims, 11 Drawing Sheets

(51) Int. Cl.
  *H04B 7/0417* (2017.01)
  *H04B 7/06* (2006.01)
(52) U.S. Cl.
  CPC ......... *H04W 72/121* (2013.01); *H04B 7/0417* (2013.01); *H04B 7/0621* (2013.01)

(56) References Cited

U.S. PATENT DOCUMENTS

| | | | |
|---|---|---|---|
| 6,628,938 B1 * | 9/2003 | Rachabathuni .. | H04N 21/25841 455/412.1 |
| 6,662,016 B1 * | 12/2003 | Buckham ................ | H04L 41/12 455/456.1 |
| 6,738,628 B1 * | 5/2004 | McCall ..................... | G01S 1/68 340/8.1 |
| 9,271,296 B2 * | 2/2016 | Olfat ................... | H04W 72/048 |
| 9,301,304 B2 * | 3/2016 | Liu ...................... | H04W 64/006 |
| 9,730,230 B2 * | 8/2017 | Irigi .................... | H04W 72/048 |
| 2015/0009910 A1 | 1/2015 | Ryu et al. | |
| 2015/0334769 A1 * | 11/2015 | Kim ...................... | H04W 36/36 370/329 |
| 2016/0095092 A1 | 3/2016 | Khoryaev et al. | |
| 2016/0212596 A1 | 7/2016 | Brahmi et al. | |
| 2016/0295595 A1 | 10/2016 | Chae et al. | |
| 2018/0092103 A1 * | 3/2018 | Gurney .................. | H04W 8/24 |

OTHER PUBLICATIONS

Beijing Xinwei Telecom Techn., Enhancement on V2V Geo-Based Resource Pool, 3GPP TSG RAN WG1 Meeting #85, May 23-27, 2016, R1-164903, Nanjing, China.
ITRI, Zone Based Dynamic Resource Management in V2X Service, 3GPP TSG RAN WG1 Meeting #85, May 23-27, 2016, R1-164935, Nanjing, China.
International Search Report dated Oct. 27, 2017, issued in the International Application No. PCT/KR2017/008498 dated Aug. 7, 2017.
LG Electronics Inc: "Geo-Information 1-15 based resource allocation", 3GPP Draft; R2-164216 Geo-Information Based Resource Allocation, 3rd Generation Partnership Project (3GPP), Mobile Competence Centre; 650, Route Des Lucioles; F-06921 Sophia-Antipolis Cedex; France vol. Ran WG2, No. Nanjing, China; May 23-27, 2016 May 14, 2016 (May 14, 2016), XP051095234, Retrieved from the Internet: URL:http://www.3gpp.org/ftp/tsg_ran/WG2 RL 2/T5GR2 94/Docs/.
Extended European Search Report dated Mar. 3, 2019, issued in European Application No. 17837301.5-1215/3443796.

* cited by examiner

METHOD AND APPARATUS FOR ALLOCATING RESOURCE IN WIRELESS COMMUNICATION SYSTEM

CROSS-REFERENCE TO RELATED APPLICATION(S)

This application claims the benefit under 35 U.S.C. § 119(a) of a Korean patent application filed on Aug. 5, 2016 in the Korean Intellectual Property Office and assigned Serial number 10-2016-0100239, the entire disclosure of which is hereby incorporated by reference.

TECHNICAL FIELD

The present disclosure relates to a method and an apparatus for allocating resources in a wireless communication system. More particularly, the present disclosure relates to a method and an apparatus for allocating resources using location information of a terminal supporting vehicle-to-vehicle (V2V) communication.

BACKGROUND

To meet the demand for wireless data traffic having increased since deployment of 4th-generation (4G) communication systems, efforts have been made to develop an improved 5th-generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM, and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology. On the other hand, wireless communication technologies have been rapidly developed in recent years, and as result communication system technologies are also evolving. Recently, V2V communication is being discussed in a wireless communication system, and a structure and an operation of D2D communication may be applied to the V2V communication.

However, in comparison with the device-to device communication, in a cell supporting the V2V communication, a larger number of terminals may receive services and messages related to safety may be frequently transmitted/received to generate more traffic. Therefore, there is a need for a method for reducing a waste of radio resources for V2V communication.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for allocating, by a base station, a resource using location information of a terminal supporting vehicle-to-vehicle (V2V) communication.

Another aspect of the present disclosure is to provide a method and an apparatus for allocating resources in response to dynamically changing situations by allocating the resources using additional situation information (hereinafter, referred to as situation information) about a terminal's situation received from devices such as various sensors and closed-circuit television (CCTV), in addition to location information of the terminal.

In accordance with an aspect of the present disclosure, a method of a base station is provided. The method includes receiving from a terminal a resource allocation request, receiving from the terminal a control message including location information of a zone where the terminal is located, and allocating a resource group based on the location information.

In accordance with another of the present disclosure, a method of a terminal is provided. The method includes transmitting to a base station a resource allocation request, transmitting to the base station a control message including location information of a zone where a terminal is located, and receiving from the base station resource allocation information including resource group information determined based on the location information.

In accordance with another of the present disclosure, a base station is provided. The base station includes a transceiver transmitting and receiving a signal, and a controller configured to control to receive from a terminal a resource allocation request, to control to receive from the terminal control information including location information of a zone where the terminal is located, and to allocate a resource group based on the location information.

In accordance with another of the present disclosure, a terminal is provided. The terminal includes a transceiver transmitting and receiving a signal, and a controller configured to control to transmit to a base station a resource allocation request, to control to transmit to the base station control information including location information of a zone where the terminal is located, and to control to receive from the base station resource allocation information including resource group information determined based on the location information.

According to the present disclosure, it is possible to efficiently allocate resources by allocating the resources using the location information of the terminal. In addition, according to the present disclosure, it is possible to allocate resources in response to the dynamically changing situations by allocating the resources using the location information and the situation information.

The effects that may be achieved by the various embodiments of the present disclosure are not limited to the above-mentioned objects. That is, other effects that are not mentioned may be obviously understood by those skilled in the art to which the present disclosure pertains from the following description.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
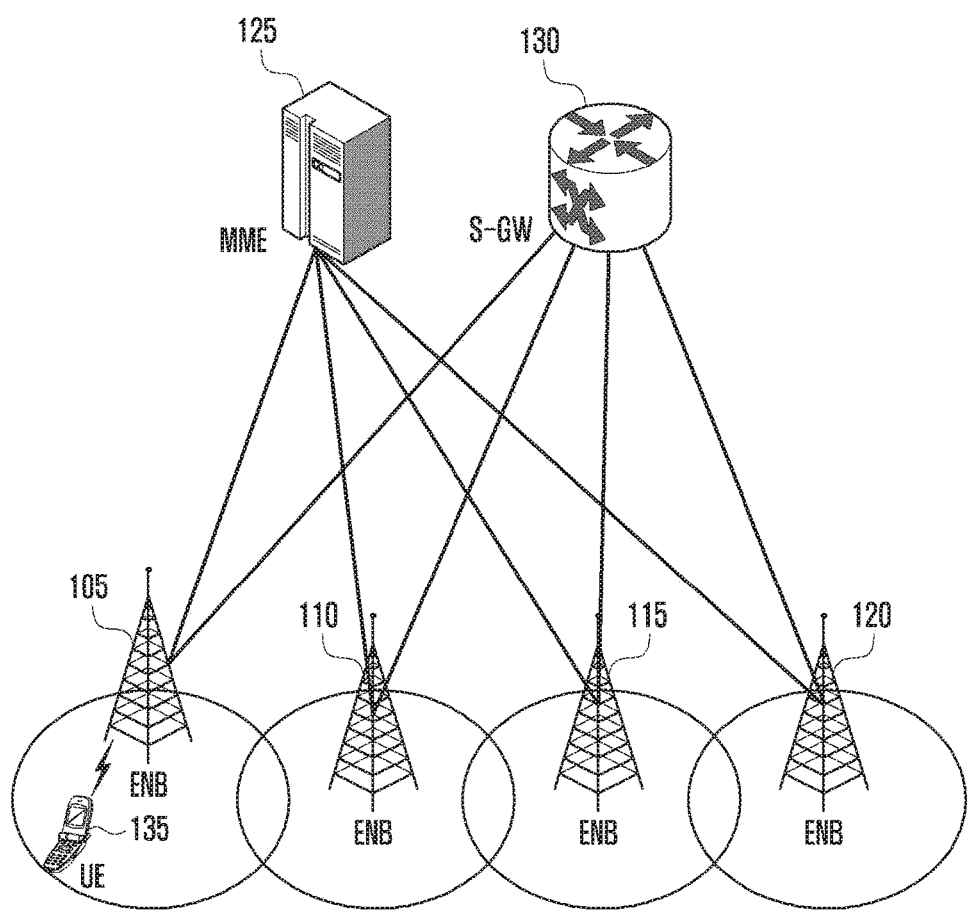
FIG. 1 is a diagram illustrating a structure of the long term evolution (LTE) system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the various embodiments of the present disclosure, a description of technical contents which are well known to the art to which the present disclosure belongs and are not directly connected with the present disclosure will be omitted. This is to more clearly transfer a gist of the present disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Further, the following terminologies are defined in consideration of the functions in the present disclosure and may be construed in different ways by the intention or practice of users and operators. Therefore, the definitions thereof should be construed based on the contents throughout the specification.

Terms identifying an access node, terms indicating network entity, terms indicating messages, terms indicating an interface between network entities, terms indicating various types of identification information, and so on that are used in the following description are exemplified for convenience of explanation. Accordingly, the present disclosure is not limited to terms to be described below and other terms indicating objects having the equivalent technical meaning may be used.

Hereafter, for convenience of explanation, the present disclosure uses terms and names defined in the 3rd generation partnership project long term evolution (3GPP LTE). However, the present disclosure is not limited to the terms and names but may also be identically applied to the system according to other standards.

Various advantages and features of the present disclosure and methods accomplishing the same will become apparent from the following detailed description of various embodiments with reference to the accompanying drawings. However, the present disclosure is not limited to the various embodiments disclosed herein but will be implemented in various forms. The various embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operations on the computer or the other programmable data processing apparatuses to create processes executed by the computer to thereby execute the computer or the other programmable data processing apparatuses may also provide operations for performing the functions described in block(s) of the flow charts.

In addition, each block may indicate some of modules, segments, or codes including one or more executable instructions for executing a specific logical function (s). Further, it is to be noted that functions mentioned in the blocks occur regardless of a sequence in some alternative embodiments. For example, two blocks that are consecutively illustrated may be simultaneously performed in fact or be performed in a reverse sequence depending on corresponding functions sometimes.

Here, the term '~unit' used in the present an embodiment means software or hardware components such as field-programmable gate arrays (FPGA) and application-specific integrated circuit (ASIC) and the '~unit' performs any roles. However, the meaning of the '~unit' is not limited to software or hardware. The '~unit' may be configured to be in a storage medium that may be addressed and may also be configured to reproduce one or more processor. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may be further separated into additional components and '~units'. In addition, the components and the '~units' may also be implemented to reproduce one or more central processing units (CPUs) within a device or a security multimedia card.

The present disclosure relates to a wireless communication system, and more particularly, to a method and an apparatus for allocating resources to a terminal. More specifically, the present disclosure describes a method and apparatus for allocating resources using location information and situation information of a terminal supporting vehicle-to-vehicle (V2V), but the scope of the present disclosure is not limited thereto. That is, the present disclosure may be applied to a terminal supporting D2D or a general terminal. In addition, the situation information may include traffic information around the terminal, and the like and the details thereof will be described later.

At this time, resources may have a form in a resource group (or a transmission resource pool) and may be allocated or mapped to the terminal. The resource group may refer to a set of resources (e.g., classified on a frequency base) classified according to predetermined criteria. The present disclosure describes a content of resource group allocation based on location information, but the scope of the present disclosure is not limited thereto.

The V2V may basically apply a structure and an operation principle of Rel-12/13 D2D. Like the D2D, data may be transmitted/received between vehicle terminals (hereinafter referred to as terminals) even in the V2V. However, as compared with the D2D, in a cell supporting the V2V, more terminals receive services and more frequently transmit/receive messages related to safety to generate more traffic. As a result, there is a need to reduce a waste of radio resources.

Accordingly, the present disclosure provides a method for allocating, by a base station, resources to minimize a collision of resources between neighboring terminals using location information of the terminals, if the terminals transmit the location information received through a global positioning system (GPS) to the base station.

As described above, the base station may improve resource allocation efficiency in the V2V based on mapping between the location information and the resources. The base station may divide a cell into at least one zone and map a zone within a cell to a resource group and map the zone within the cell to the resource group to minimize the collision of resources. Specifically, the base station may map the zone to the resource group so that the same resource group is not allocated to adjacent zones among the zones within the cell. Accordingly, the base station may identify the zone where the terminals are located based on the location information of the terminal and allocate the resource group mapped to the zone to the terminal. This is due to the fact that the V2V terminals have an available communication range. That is, since the V2V terminals have the available communication range, even when the same resource is allocated to the terminal over a certain distance, a collision may not occur, and the base station may allocate different resource groups to adjacent zones and allocate the same resource group to the terminal located over a certain distance, thereby effectively allocating a limited resource to the terminal.

In addition, the base station may use the situation information in addition to the location information received from the terminals when allocating a resource group (e.g., a resource pool). The situation information may include additional information the terminal's situation that is acquired from a traffic infrastructure around a road for V2V such as various sensors and closed-circuit television (CCTV). The situation information may include, for example, a speed of the terminal, the total number of terminals included in a space where the terminals are located, a size of a zone where the terminals are located, and the like.

Meanwhile, the location information of the terminal may be transmitted to radio resource control (RRC) signaling (e.g., Location Info) or a new media access control (MAC) control element (CE). The MAC CE may be, for example, a buffer status report MAC CE in a new format (may include an indicator that notifies at least a buffer status report for V2V communication and information on a size of data that are buffered for D2D communication), or the like. The detailed format and content of the buffer status report used in the 3GPP refer to 3GPP standard TS36.321 "E-UTRA MAC Protocol Specification".

In addition, the terminal may operate in mode 1 or mode 2 for device-to-device (D2D) communication or V2V communication. In the case of the mode 1, the terminal may request a resource to the base station for the D2D communication or the V2V communication in a state in which it is RRC-connected with the base station, and the base station may allocate resources for the D2D communication or the V2V communication to the terminal according to the resource request of the terminal. Accordingly, the terminal may perform the D2D communication or the V2V communication using the resources allocated from the base station.

In the case of the mode 2, the base station may notify the terminal of candidates for the resources for the D2D communication or the V2V communication as system information, and the terminal may perform D2D communication or V2V communication with other terminals using determined resources at random or in a predetermined manner.

In this case, the terminal may operate in mode 2 in an idle state (hereinafter, may be interchangeably used with the idle state) and a connected state (hereinafter, a connected state). If the terminal operates in the idle state (the terminal directly selects a resource), the terminal can directly identify a resource group to be used by using the location information according to a predetermined method (mapping rule). That is, the terminal may directly identify the resource group to be used based on the mapping information between the location information and the resource group. In addition, if the terminal operates in the connected state (the terminal selects ones from resources reconfigured by the base station), the terminal reports the location information to the base station, and then the base station may allocate the resource group to the terminal. Accordingly, the terminal may determine the resources to be used among the resources included in the resource group at random or in a predetermined manner.

FIG. 1 is a diagram illustrating a structure of the LTE system according to an embodiment of the present disclosure.

Referring to FIG. 1, the wireless communication system may include several base stations (may be referred to as an evolved node B (hereinafter, an ENB and a Node B) or a BS) 105, 110, 115, and 120 and mobility management entity (hereinafter, may be referred to as MME) 125, and a serving-gateway (hereinafter, may be referred to as S-GW) 130. User equipment (hereinafter, LE or terminal) 135 may be connected to an external network through the ENBs 105, 110, 115, and 120 and the S-GW 130.

Referring to FIG. 1, the base stations 105, 110, 115, and 120 correspond to the existing node B of a universal mobile telecommunications system (UNITS). The base stations 105, 110, 115, and 120 are access nodes of a cellular network and provide a wireless access to terminals that are connected to the network. That is, in order to serve traffic of users, the base stations 105, 110, 115, and 120 collect and schedule status information such as a buffer status, an available transmission power status, and a channel status of the terminals to support a connection between the terminals and a core network (CN). One base station may generally control a plurality of cells.

For example, to implement a transmission rate of 100 Mbps, the system may use, as a radio access technology, orthogonal frequency division multiplexing (hereinafter, OFDM) in a bandwidth of 20 MHz. Further, the LTE may apply an adaptive modulation & coding (hereinafter, called AMC) scheme that determines a modulation scheme and a channel coding rate in accordance with the channel status of the terminal.

The MME 125 is an apparatus for performing various control functions as well as a mobility management function for the terminal, and may be connected to a plurality of base stations, and the S-GW 130 is an apparatus for providing a data bearer. Further, the MME 125 and the S-GW 130 may further perform authentication, bearer management, etc., on the terminal connected to the network and may process packets that arrive from the base stations 105, 110, 115, and 120 and are to be transmitted to the base stations 105, 110, 115, and 120.

Figure 2:
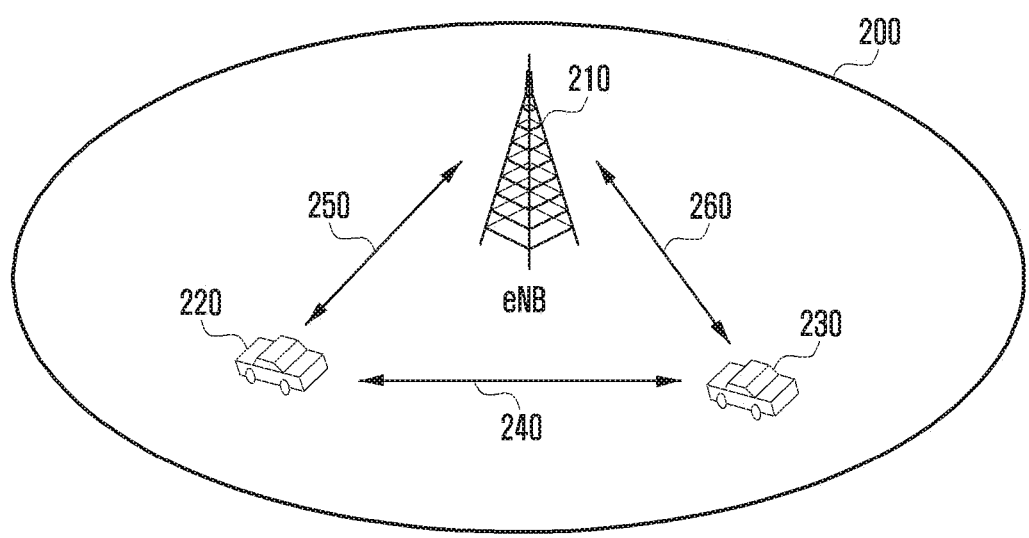
FIG. 2 is a diagram for explaining vehicle-to-vehicle (V2V) communication in a wireless communication system according to an embodiment of the present disclosure.

FIG. 2 is a diagram for explaining V2V communication in a wireless communication system according to an embodiment of the present disclosure.

FIG. 2 illustrates an example of performing V2V communication in a cellular system according to an embodiment of the present disclosure.

Referring to FIG. 2, the base station 210 may manage or control at least one terminal 220, 230 located within the cell 200. A first terminal 220 may perform communication (cellular communication) with the base station 210 using a first link 250 between the first terminal and the base station 210, and the second terminal 230 may perform communication (cellular communication) with the base station 210 using a link 260 between the second terminal and the base station.

Meanwhile, if the first terminal 220 and the second terminal 230 are capable of V2V communication, the first terminal 220 and the second terminal 230 may directly transmit/receive information to/from each other using a third link (hereinafter, may be referred to as a side link) 240 without going through the base station 220. At this time, the number of terminals receiving a V2V service within one cell may be plural, and the relationship between the base station 210 and the terminals 220 and 2304 as described above may be extended and applied. That is, a plurality of terminals may communicate with a base station within one cell. In addition, the plurality of terminals may directly transmit/receive information between terminals without going through a base station.

Figure 3:
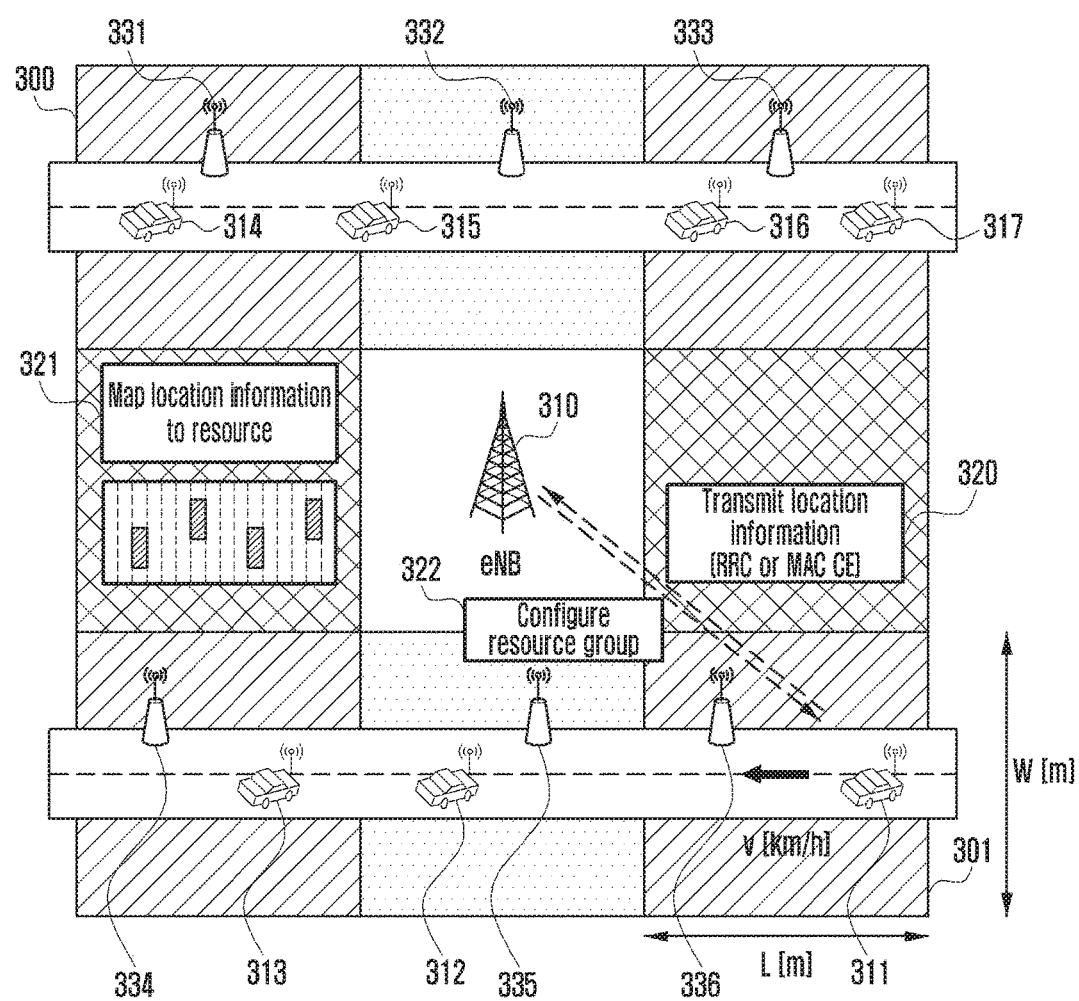
FIG. 3 is a diagram illustrating a method for allocating resources by a base station according to an embodiment of the present disclosure.

FIG. 3 is a diagram illustrating a method for allocating resources by a base station according to an embodiment of the present disclosure.

Referring to FIG. 3, the base station 310 may allocate resources based on location information of terminals 311 to 317 in order to reduce a collision of the resources between the terminals 311 to 317 located within one cell 300. For example, different resources may be allocated to neighboring terminals, and the same resources may be allocated to terminals located far away from each other. It is presumed that the data transmitted by the terminal in the V2V communication is for broadcasting to neighboring terminals within a predetermined radius. Therefore, a method for allocating resources based on location information will be described below.

The information (hereinafter referred to as zone configuration information) related to a zone 301 includes a GPS position (e.g., reference coordinate information including latitudes and longitudes by zone) and size information of a zone (e.g., a horizontal length L[m] and a vertical length W[m]), the number of zones within the cell 300, and the like. The base station may transmit the zone configuration information configured within the cell 300 to the terminal and receive the information (hereinafter, location information) of the zone where the terminal is located from the terminal to allocate resources.

Specifically, the terminals 311 to 317 may transmit the location information to the base station in operation 320. At this time, the terminal directly reports the location information (e.g., the coordinates configured by a latitude and a longitude of a location where the terminal is located) of the terminal received through the GPS or may report information on divided zones in the zone within the cell 300, for example, index information of the zone 301 or identifier (ID) information of the zone 301 to the base station. In the present disclosure, a zone index or a zone ID may be interchangeably used with each other.

In operation 320, the location information transmitted by the terminal may be transmitted using a control message such as RRC signaling Location Info and a new MAC CE (hereinafter, Geo MAC CE) which is the existing measurement mechanism. Alternatively, it may generate reporting information (Geo reporting) including the location information of the terminal, and may transmit the Geo reporting to the base station through the control message such as the RRC signaling or the Geo MAC CE. In the present disclosure, an example in which the terminal generates the Geo reporting including the location information will be described. However, the embodiment of the present disclosure is not limited thereto.

The Geo reporting (or the control message) may include at least one of GPS coordinate information, index information of a zone, and time related information (Timestamp: time at which GPS information is acquired).

Therefore, the base station may map resources to zones existing within a cell using the location information received from the terminals in operation 321. In addition, the base station may map, to the location information, resource groups for zones existing within a cell using situation information received from traffic infrastructures 331 to 336 around a road for V2V such as various sensors and CCTV.

Specifically, the base station may allocate resource groups to each zone so that the same resource group is not allocated between adjacent zones. Referring to FIG. 3, it may be seen that a zone having the same display means a zone using the same resource group, a zone having other displays means a zone using other resource groups, and different resource groups are allocated to the adjacent zones.

In operation 322, the base station may configure a resource group in the terminal. The base station may allocate the mapped resource groups to the terminal depending on the zone where the terminal is located. At this time, the base station transmits the resource group mapping information mapped according to the zone configuration information e.g., the size information of the zone, the number of zones within the cell, etc.) and the resource group mapping information mapped to each zone to the system information block (hereinafter, SIB) to enable the terminal to know the available resource group or directly configure the resource group in the terminal through the RRC signaling.

Figure 4:
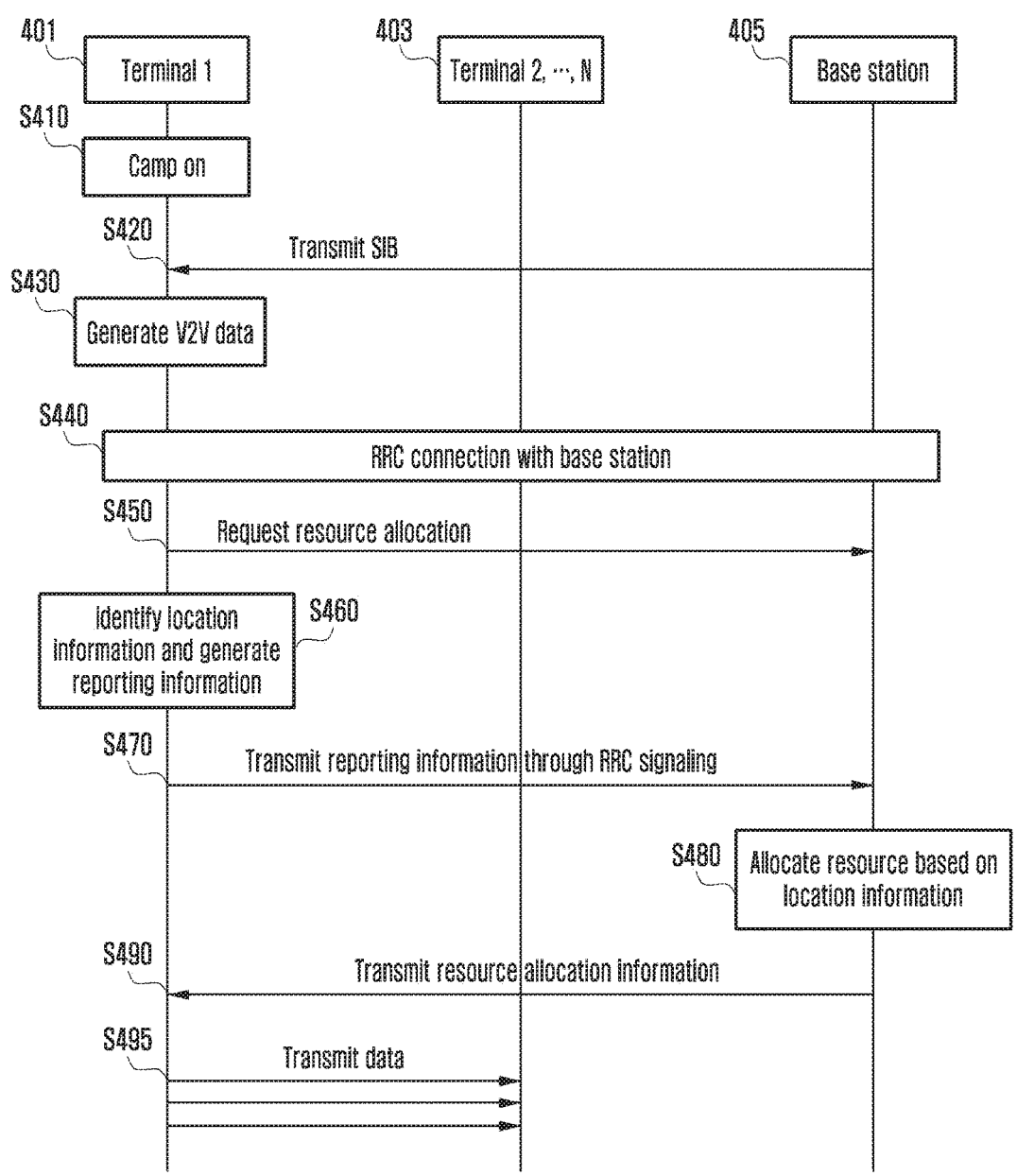
FIG. 4 is a diagram illustrating a process of allocating, by a base station, resources based on location information according to an embodiment of the present disclosure.

FIG. 4 is a diagram illustrating a process of allocating, by a base station, resources based on location information according to an embodiment of the present disclosure.

Referring to FIG. 4, a terminal 1 401 supporting V needs to be allocated resources from a base station 405 to transmit/receive data to/from other terminals 403. Therefore, a method for allocating, by a base station, resources for V2V communication will be described below.

In operation S410, the terminal 1 401 may camp on the base station 405. In operation S420, the terminal 1 401 which is camping on may receive the SIB from the base station. At this time, the SIB for V2V may be included, and the SIB for V2V may be used by extending the existing SIB18 or defining a new SIB for V2V. The SIB received by the terminal may include configuration information (hereinafter, may be referred to as reporting configuration information) for reporting location information in addition to information (transmission/reception resource group and synchronization configuration information) included in the existing SIB18.

The reporting configuration information may include at least one of reporting period information of the location information, the size information of the zone (e.g., the horizontal length L[m], the vertical length W[m]), and the number of zones within the cell. As described above, the size information of the zone and the number of zones within the cell may be referred to as the zone configuration information. The period information may be determined based on the situation information such as the speed of the terminal within the zone or the size information of the zone, and the detailed content thereof will be described later.

In operation S430, data to be transmitted to other terminals 403 may be generated in the terminal 1 401.

If data to be transmitted to other terminals are generated, in operation S440, the terminal 1 401 may be RRC-connected with the base station 405. Alternatively, data to be transmitted to other terminals 403 may be generated in the terminal 1 401 in the state in which the terminal 1 401 is RRC-connected with the base station.

Thereafter, in operation S450, the terminal 1 401 may request the resource allocation to the base station. Specifically, the terminal 1 401 may request the resource allocation for the V2V by transmitting a resource allocation request message to the base station. At this time, the resource allocation request message may include a sidelink UE information message or a new RRC message. In addition, the resource allocation request message may include the indicator for indicating the reporting information (Geo reporting) and the reporting period information of the location information.

However, the operation S450 may be skipped.

In operation S460, the terminal 1 401 may identify the location information. The terminal 1 401 may identify the location information via the GPS and generate the Geo reporting based on the location information to transmit the location information to the base station. The Geo reporting may include at least one of GPS coordinate information, the index information of the zone, and the time related information (Timestamp: time at which the GPS information is acquired).

In operation S470, the terminal 1 401 that identifies the location information and the Geo reporting may transmit the Geo reporting through the RRC signaling (Location Info) that is the existing measurement mechanism.

Alternatively, the terminal 1 401 may transmit the location information to the terminal by including the location information in a control message such as an RRC message, without generating separate Geo reporting.

In operation S480, the base station 405 may allocate resources to the terminal 1 401 based on the location information. The base station 405 may allocate the resource group to the terminal 1 401 to minimize a collision with the resources allocated to the neighboring terminals 403. Specifically, the base station may map a zone to a resource group so that a different resource groups are allocated to adjacent zones and may allocate, to the terminal, a resource group mapped to a zone where the terminal is located.

In operation S490, the base station 405 may transmit the resource allocation information to the terminal 1 401. That is, the base station 405 may transmit the resource allocation information to the terminal 1 401 (hereinafter, it may be interchangeably used with the term 'resource group information or a resource group ID'). At this time, the base station 405 may transmit the information on the resource group to the terminal 1 401 through the system information or RRC reconfiguration message.

Specifically, in operation S490, the base station may provide the resource group mapping information mapped according to the zone information, and the terminal may be configured to use the resource group based on its own zone information. Alternatively, the base station may directly transmit the information on the resource group to be used by the terminal based on the zone information of the terminal. However, in the case of providing the resource group mapping information mapped to the zone information and configuring the terminals 401 and 403 to use the resource group mapped to the index information of the zone, it is difficult to appropriately reflect the dynamically changing situation. On the other hand, if the base station 405 directly configures the resource group in the terminal, it is possible to allocate or add the optimized resource group to the terminals 401 and 403 by reflecting the location information and the additional situation information.

Thereafter, in operation S495, the terminal 1 401 may transmit data to other terminals 403 through the resources allocated from the base station 405.

Figure 5:
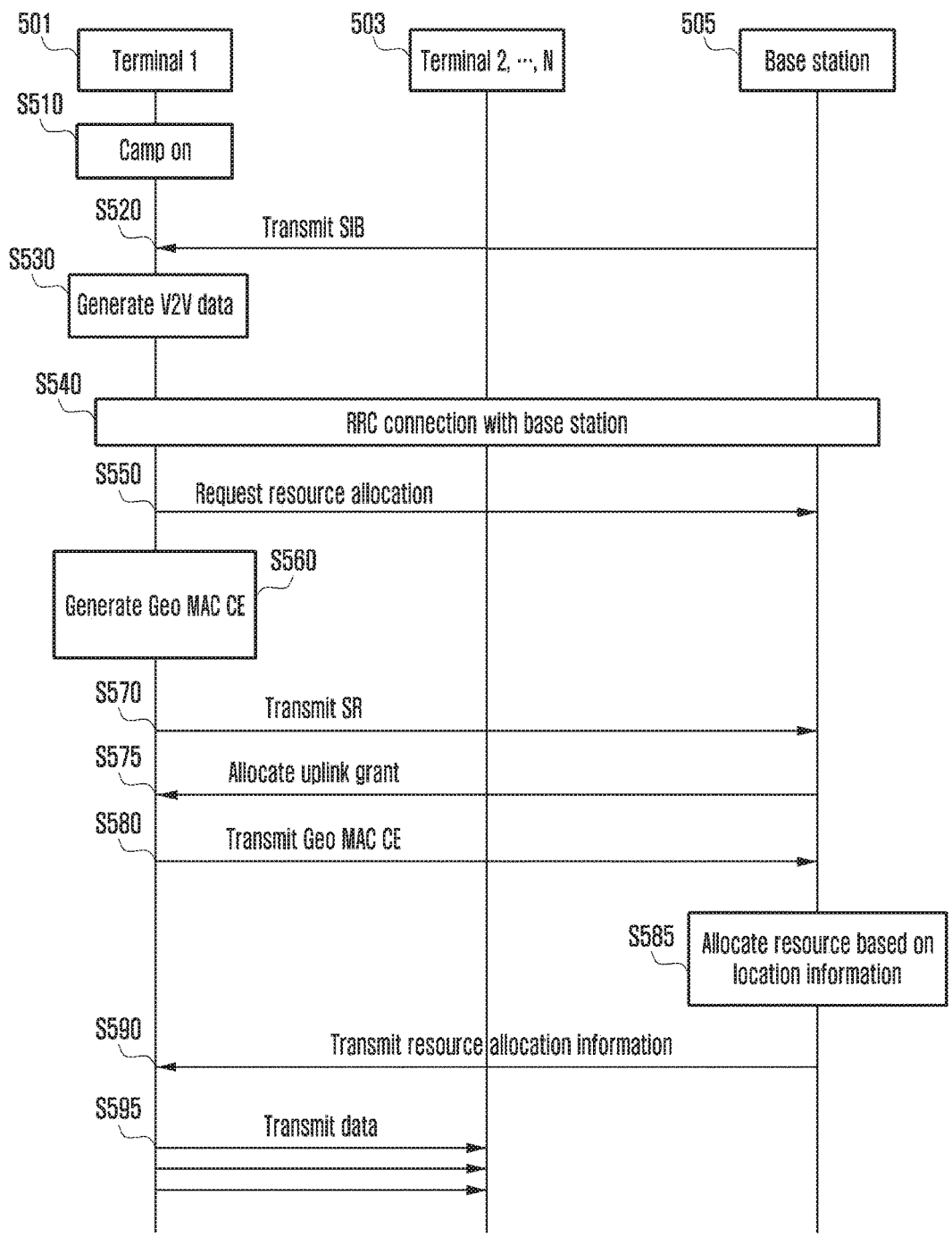
FIG. 5 is a diagram illustrating another process of allocating, by a base station, resources based on location information according to an embodiment of the present disclosure.

FIG. 5 is a diagram illustrating another process of allocating, by a base station, resources based on location information according to an embodiment of the present disclosure.

Referring to FIG. 5, a terminal 1 501 supporting V2V needs to be allocated resources from a base station 505 to transmit/receive data to/from other terminals 503.

In operation S510, the terminal 1 501 may camp on the base station 505. In operation S520, the terminal 1 501 which is camping on may receive the SIB from the base station. At this time, the SIB for V2V may be included, and the SIB for V2V may be used by extending the existing SIB18 or defining a new SIB for V2V. The SIB received by the terminal may include reporting configuration information for location information report in addition to the information (transmission/reception resource group and synchronization configuration information) included in the existing SIB18.

The reporting configuration information may include at least one of reporting period information of the location information, the size information of the zone (e.g., the horizontal length X[m], the vertical length Y[m]), and the number of zones within the cell.

In operation S530, data to be transmitted to other terminals 503 may be generated in the terminal 1 501.

If data to be transmitted to other terminals are generated, in operation S540, the terminal 1 501 may be RRC-connected with the base station 505. Alternatively, data to be transmitted to other terminals 503 may be generated in the terminal 1 401 in the state in which the terminal 1 501 is RRC-connected with the base station.

Thereafter, in operation S550, the terminal 1 501 may request the resource allocation to the base station. Specifically, the terminal 1 501 may request the resource allocation for the V2V by transmitting a resource allocation request message to the base station. At this time, the resource allocation request message may include a sidelink UE information message or a new RRC message. In addition, the resource allocation request message may include an indicator for indicating Geo MAC CE reporting including the location information and reporting period information.

However, the operation S550 may be skipped.

In operation S560, the terminal 1 501 may identify the location information. The terminal 1 501 may identify the location information through the GPS and may include the Geo reporting including the location information in the Geo MAC CE. Alternatively, the terminal may generate the Geo MAC CE including the location information. At this time, the Geo MAC CE including the location information may include the existing MAC CE or a newly defined MAC GE. In addition, the Geo MAC CE may include at least one of GPS coordinate information, the index information of the zone, and the time related information (Timestamp: time at which the GPS information is acquired).

The MAC CE may be generated from the MAC (e.g., a buffer status report (BSR)) or may consist of information (e.g., a power headroom report (PHR)) transmitted from a lower layer, while the Geo MAC CE may consist of information transmitted from a higher layer. Among the information included in the Geo MAC CE, the GPS coordinate information and the timestamp information are acquired by the GPS module of the terminal and transmitted to the MAC via the RRC, and the index information of the zone may be acquired by the RRC of the terminal through the system information and then transmitted to the MAC.

In addition, in order for the terminal to transmit the Geo MAC CE, a scheduling request (SR) needs to be triggered and thus the terminal needs to be allocated resources. However, according to current LTE procedure, only a regular BSR triggers the SR. In other words, the MAC CE of the related art, which consists of the information transmitted from other layers, does not trigger the SR. Accordingly, according to the present disclosure, the terminal may be configured to trigger the SR if the MAC CE is the Geo MAC CE and not to trigger the SR if the MAC CE is another MAC GE (e.g., PHR MAC CE or C-RNTI MAC CE, or the like). Alternatively, if the MAC itself determines whether to trigger the MAC CE (MAC CEs such as regular BSR and PER correspond thereto), the type of MAC CEs is checked to determine whether or not to trigger the SR and the SR may be triggered together regardless of the type if the trigger of the MAC CE is determined by the higher layer (Geo MAC CE corresponds thereto). Further, once the existing MAC CE is generated, the existing MAC CE is not discarded until it is transmitted. However, in the case of the Geo MAC CE, if a new Geo MAC CE is generated based on new location information, the need for the previously generated Geo MAC CE disappears. Therefore, if the Geo MAC CE is triggered, the terminal checks whether there is a Geo MAC CE that has not yet been transmitted and discards the Geo MAC CE that is not transmitted, such that the previous Geo MAC CE and the new Geo MAC CE are not transmitted together but only the new Geo MAC CE may be transmitted.

Accordingly, the terminal 1 501 may transmit the SR to the base station 505 in operation S570 and receive an uplink grant from the base station 505 in operation S575.

In addition, if the size of the uplink grant is sufficient for the Geo MAC, CE transmission, in operation S580, the terminal 501 may transmit the Geo MAC CE.

On the other hand, if the size of the uplink grant is insufficient for the Geo MAC CE transmission, the terminal 1 501 may transmit the BSR to the base station 505. At this time, the terminal 1 501 may code the amount of data of the Geo MAC CE, by the buffer status or the buffer size (BS) of a predetermined logical channel group (LCG) and transmit it. The base station may use the RRC control message to set in which BS of the LCG the Geo MAC CE is included in the terminal or may also use a predetermined rule. The rule may include, for example, a rule for regarding the data of the Geo MAC CE as data of a logical channel set in the terminal or a logical channel or a LCG having a highest priority among LCGs and including the data in the BS of the LCG. Alternatively, the rule may also include a rule for regarding the data included in the Geo MAC CE as the data of the predetermined logical channel (e.g., SRB1) and including the data in the BS of the LCG of the SRB1.

In operation S585, the base station 505 may allocate resources to the terminal 1 501 based on the location information included in the Geo MAC CE. The base station 505 may allocate the resource group to the terminal 1 501 to minimize a collision with the resources allocated to the neighboring terminals 503. Specifically, the base station may map a zone to a resource group so that a different resource groups are allocated to adjacent zones and may allocate, to the terminal, a resource group mapped to a zone where the terminal is located.

In operation S590, the base station may transmit the resource allocation information to the terminal 1 501. That is, the base station 505 may transmit the information on the resource groups allocated to the terminal 1 501. At this time, the base station 505 may transmit, to the terminal 1 501, the system information or the information on the resource group allocated through the RRC reconfiguration message.

Specifically, in operation S590, the base station may provide the resource group mapping information mapped according to the zone information, and the terminal may be configured to use the resource group based on its own zone information. Alternatively, the base station may directly transmit the information on the resource group to be used by the terminal based on the zone information of the terminal. However, in the case of providing the resource group mapping information mapped to the zone information and configuring the terminals 501 and 503 to use the resource group mapped to the index information of the zone (operating in the idle state of the mode 2), it is difficult to appropriately reflect the dynamically changing situation. On the other hand, if the base station 505 directly configures the resource group in the terminal, it is possible to allocate or add the optimized resource group to the terminals 501 and 503 by reflecting the location information and the additional situation information.

Thereafter, in operation S95, the terminal 1 501 may transmit data to other terminals 503 through the resources allocated from the base station 505.

On the other hand, in the case of a terminal operating in mode 2, resources may be allocated to the terminal by the two methods as described above. The first method is a method for providing information on a resource group to terminals in an idle state through system information (e.g., SIB18 or a new SIB for V2V), and the second is a method for providing information on a resource group to terminals in a connected state through the RRC signaling.

Figure 6:
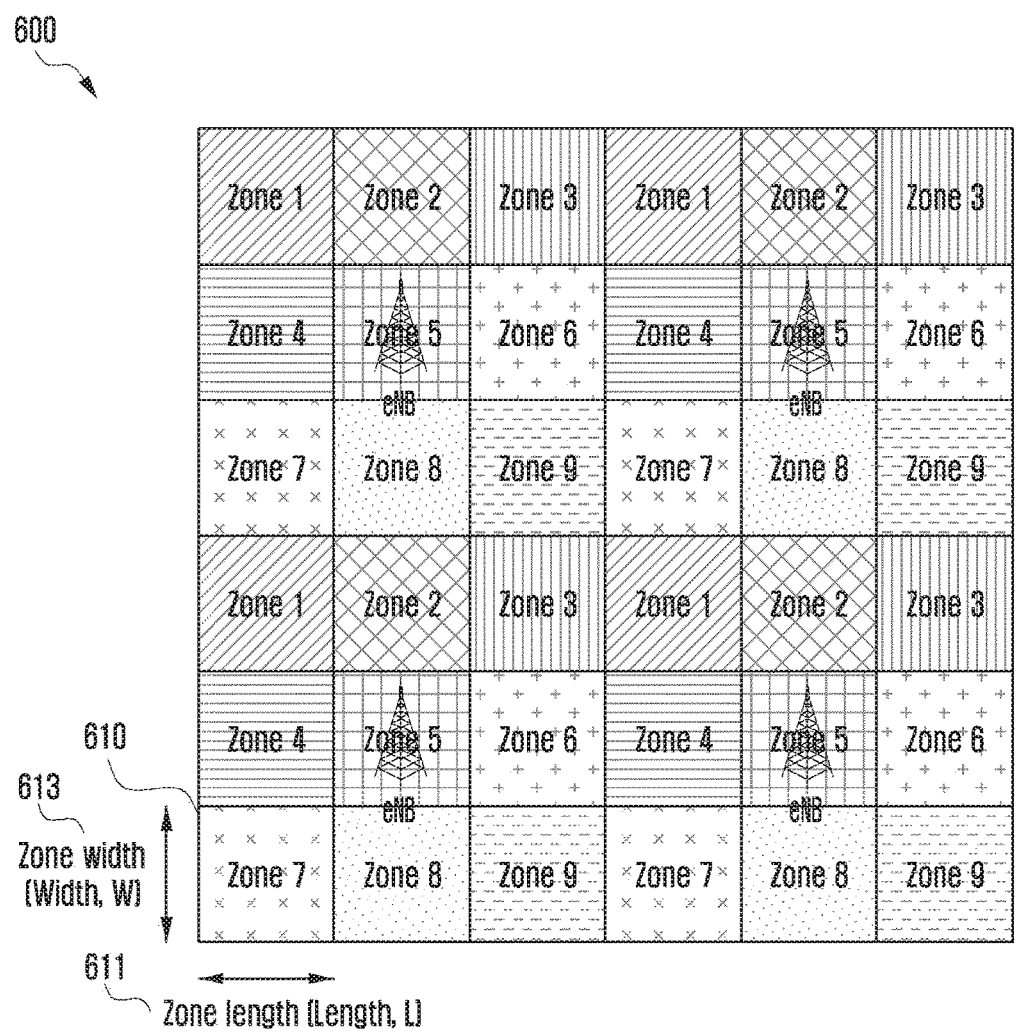
FIG. 6 is a diagram illustrating a method for mapping location information to a resource group for a terminal in an idle state according to an embodiment of the present disclosure.

FIG. 6 is a diagram illustrating a method for mapping location information to a resource group for a terminal in an idle state according to an embodiment of the present disclosure.

Referring to FIG. 6, one cell 600 may include at least one zone. The base station may transmit the zone configuration information, which is the information on the zone included in the cell, to the terminal, and the detailed content thereof is as described above. At this time, the zone configuration information includes a length 611, L of a zone 610, a width 613, W of the zone, and reference coordinates $x_0$ and $y_0$ of the zone and a number $N_x$ in an axis direction and a number $N_y$ in a y-axis direction of the zone, or the like (615).

If data are generated as described above, the terminal may identify the location information and transmit it to the base station. At this time, the terminal may transmit the latitude and longitude coordinates (x, y) of the terminal measured by the GPS to the base station. Alternatively, the terminal may acquire the zone ID using the latitude and longitude coordinates and transmit it to the base station. For example, the terminal may acquire the zone II) through the following Equation 1.

$$\text{Zone ID}=[\text{Ceil}((x-x_0)/L)] \bmod N_x - N_x \times [\text{Ceil}((y-y_0)/W)] \bmod N_y + 1. \quad \text{Equation 1}$$

The above Equation 1 may be slightly modified as long as it may share the zone ID between the terminal and the base station according to the method for configuring a zone 610.

When the terminal is in the idle state, the base station may broadcast the resource group mapping information used in the cell through the system information, and the terminals may perform the D2D communication or V2V communication even in the idle state using the resource group mapping information. Therefore, in order to reduce the interference of the resource groups between neighboring terminals, the base station may transmit the resource group mapping information in which the zone index (zone ID) and the resource group are mapped to each other to the terminal according to the predetermined rule, and the terminal may identify the resource group to be used by using the resource group mapping information. At this time, the resource group that may be used in the state in which the terminal is connected to the resource group available in the idle state may be separated and configured, and the detailed content thereof will be described later. In addition, the predetermined rule may include, for example, a method for allocating different resource groups to adjacent zones. Therefore, the base station may map the resource group so that different resource groups are allocated to the adjacent zones, and the resource groups for the zones may be mapped to each other on a one-to-on basis. Accordingly, if the terminal is located in a specific zone, the terminal may use the resource group allocated to the zone ID of the zone to perform communication. The base station may transmit zone configuration information 611, 613, and 615 necessary for configuring the zone 610 to the terminals existing within the cell through the system information.

Figure 7:
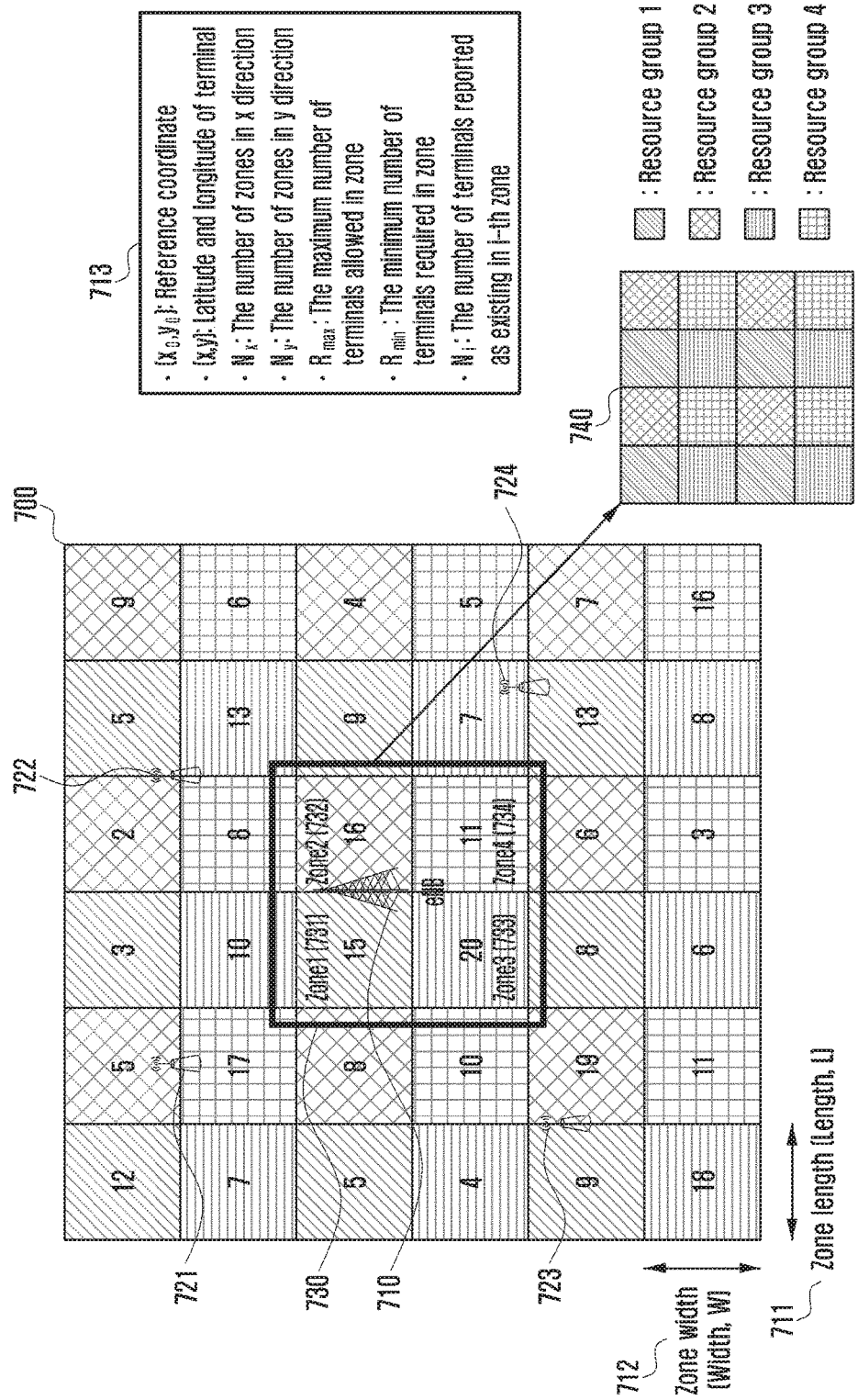
FIG. 7 is a diagram illustrating a method for mapping a resource group for a terminal in a connected state according to an embodiment of the present disclosure.

FIG. 7 is a diagram illustrating a method for mapping a resource group for a terminal in a connected state according to an embodiment of the present disclosure.

In the case of allocating resources using the system information as illustrated in the above example, the base station transmits the resource group mapping information (or resource group mapping information usable in the idle state) on the entire resource group to the terminal, in which the terminal may use the resource group according to the zone where the terminal is located. In other words, if the resources are allocated using system information, they can only be used as static resource allocation. However, the interference may occur even when different resource groups are allocated to adjacent zones according to the situation information of the zone where the terminal is located. For example, when the number of terminals in a specific zone is larger than a predetermined maximum value, the interference may occur even when communication is performed based on the allocated resource group within one zone. Therefore, the base station needs to allocate resources flexibly and efficiently according to changes in traffic conditions (temporary traffic congestion and mitigation in a specific zone).

To address the problem, there is proposed a method for adaptively allocating resource groups by using Geo reporting transmitted by terminals in a connected state.

Referring to FIG. 7, one cell may include at least one zone. In the present an embodiment, if the number of resource groups provided to one cell 700 is four or more, a base station 710 proposes a method for allocating resource groups. This is based on the assumption that four or more resource groups are required and four or more resource groups are configured because it is assumed that the number of terminals in a cell supporting V2V is many. However, the scope of the present disclosure is not limited thereto.

The base station 710 may transmit zone configuration information 711, 712, and 713 necessary for configuring the zone to the terminals existing within the cell through the system information. The zone configuration information includes a length 711, L of a zone 712, a width 712, W of the zone, and reference coordinates $(x_0, y_0)$ of the zone and a number $N_x$ in an x-axis direction and a number $N_y$ in a y-axis direction of the zone, or the like that exist within one cell.

If data are generated as described above, the terminal may identify the location information and transmit it to the base station. At this time, the terminal may transmit the latitude and longitude coordinates (x, y) of the terminal measured by the UPS to the base station. Alternatively, the terminal may acquire the zone ID using the latitude and longitude coordinates and transmit it to the base station. For example, the terminal may acquire the zone ID through the Equation 1 described above.

Further, the base station 710 may know the number of terminals in the connected state existing in each zone through the Geo reporting transmitted from the terminals. The base station may arbitrarily set the maximum number of terminals ($R_{max}$ or a predetermined maximum value) allowed in the resource group and the minimum number of terminals required in the zone ($R_{min}$ or a predetermined minimum value) or may them to values defined in the standard. In addition, situation information, which is additional information, may be acquired from infrastructures 721 to 724 such as a CCTV and a sensor installed on a road. The base station may identify the total number of terminals in the cell 700 supporting the V2V service through the infrastructures 721 to 724 such as the CCTV and the sensor installed on the road. In addition, the base station may identify the total number of terminals existing within the cell 700 through and the number of terminals in the idle state and the connected state through a counting message or the like transmitted by the RRC connected terminals. Therefore, the base station may reallocate the resource group using the acquired information according to the number of terminals located in the zone.

The present disclosure proposes a method for allocating resource groups to a terminal using zone configuration information and received location information.

As described above, the base station may allocate different resource groups to adjacent zones according to the predetermined rule. The detailed content thereof is as the following description.

1. The base station may identify the total number $N_{C\_pool}$ of resource groups available in the cell. As described above, the total number of resource groups may consist of four or more ($N_{C\_pool} \geq 4$).

2. The base station may configure four resource groups to be repeated in one set to use four resource groups in all zones. As illustrated in FIG. 7, in the case where four different resource groups are configured to be allocated to four adjacent zones, it is possible to exclude the interference in the adjacent zones with respect to the specific zone. Specifically, a method for allocating a resource group is as follows.

A. Resource group mapping in a zone belonging to an odd row ((Zone ID)/$N_x$+1 is an odd number).

It may be set to use a resource group that satisfies a resource group index (The index of Tx resource)=(Zone ID) mod 2+1.

B. Resource group mapping in a zone belonging to an even row ((Zone ID)/$N_x$+1 is an even number).

It may be set to use a resource group that satisfies a resource group index (The index of Tx resource pool (even rows))=(Zone ID) mod 2+3.

Alternatively, the base station may map a resource group to a zone by a method for determining four resource groups to be used among all the resource groups, alternately allocating two resource groups in the first row, and alternately allocating the other two resource groups if the index of the row increases by one. Alternatively, the base station may map a resource group to a zone by a method for alternately allocating two resource groups in the first column and alternately allocating the other two resource groups by alternately allocating the two resource groups if the index of the column increases by one.

3. If it is impossible to support the D2D communication or the V2V communication of the terminal through the above procedure, the base station may reallocate resources based on a virtual sector 730.

At this time, the case where it is impossible to support the D2D communication or the V2V communication of the terminal may refer to the case where the number of terminals located in the zone exceeds the predetermined maximum value and therefore the resources in the resource group may not be allocated to all terminals by the above procedure or the case where the number of terminals located in the zone is smaller than the predetermined minimum value.

Therefore, the base station may re-interpret the zone and then apply a correction algorithm to allocate resources. At this time, the method for re-interpreting a zone and then applying a correction algorithm may mean a method for separating or merging, by a base station, zones to allocate resources.

Specifically, if the number of terminals in the specific zone exceeds the predetermined maximum value, the base station may separate the zone to reallocate resources. If the number of terminals in the specific zone exceeds the predetermined maximum value, the interference may occur even when the terminal uses the resources included in the resource group. Accordingly, the base station may separate the zone to allocate additional resource groups to the zone.

Similarly, if the number of terminals in the specific zone is less than the predetermined minimum value, the base station may merge the zone with other adjacent zones and allocate the same resource group to the merged zone. At this time, if the number of terminals (the number of first terminals) in the specific zone is less than the predetermined minimum value, the base station may identify whether or not a value obtained by adding the number of terminals (the number of second terminals) of adjacent zones to the number of first terminals is less than the predetermined maximum value. If the sum of the number of first terminals and the number of second terminals is less than the predetermined maximum value, the base station may merge the zones and allocate the same resource group. Further, the base station may merge two or more zones, and merge the zones until the sum of the numbers of terminals in adjacent zones exceeds the predetermined maximum value.

In this case, the sector means a virtual zone formed to be newly analyzed by the base station based on the merging and separating of the zones but may not mean the change of the actual zone.

The detailed method for reallocating resources will be described below.

A. If a resource group to be allocated to a terminal existing in a sector is insufficient (e.g., if the number of terminals exceeds a predetermined maximum value), the base station separates the zone into the virtual sector such as 740, thereby redistributing the resource groups.

Referring to FIG. 7, the number of terminals included in a zone 1 731 may be 15, the number of terminals included in a zone 2 732 may be 16, the number of terminals included in a zone 3 733 may be 20, and the number of terminals included in a zone 4 734 may be 11. For example, if the predetermined maximum value ($R_{max}$)=10, the base station may identify that more terminals than the number of terminals that may be supported in each zone exist in zones 1 to 4.

① if the number of extra resource groups for the terminal in the connected state held by the base station is larger than the number of the zones (the case where the number of extra transmission resource pools is 4 or more is always satisfied) where the number of terminals in the sector exceeds the predetermined maximum value:

If the maximum number of terminals that may be supported in a specific zone existing in a sector exceeds, the base station may directly allocate additional resource groups to the exceeding terminals. To reduce the RRC signaling load, single-cell point-to-multipoint transmission (SC-PTM) or zone-specific transmission techniques may be used. Therefore, one resource group may be additionally allocated to one resource group that is basically allocated to the specific zone.

② If the number of extra resource groups for a terminal in the connected state held by the base station is smaller than the number of zones (hereinafter, may be referred to as a zone where an exceptional case occurs) where the number of terminals in the sector exceeds a predetermined maximum value (which is generated in the case where the number of extra resource groups is less than 4):

The base station may allocate the extra resource group in the order of the zones having the largest number of terminals. However, if the number of extra resource groups is insufficient, a resource group may be allocated to a zone located in a diagonal direction with respect to a zone where an additional resource group is required, or a resource group least affected by the interference among the resource groups of adjacent zones may be determined and may be additionally allocated.

Here, in order to determine an appropriate resource group, a resource group in which the summed value of the number of terminals included in surrounding zones using the same resource group is smallest may be selected. For example, it is assumed that the number of terminals included in the zone 1 731 is 15, the number of terminals included in the zone 2 732 is 16, the number of terminals included in the zone 3 733 is 20, and the number of terminals included in the zone 4 734 is 11. Further, it is assumed that the predetermined maximum value is 13. Therefore, a resource group should be added to each of the zone 1 731, the zone 2 732, and the 3 zone 733. However, if there are two extra resource groups, the base station may add a resource group to the zone 3 733 and the zone 2 732 that have the largest number of terminals. In addition, the base station may allocate the resource group of the zone 4 734 located in the diagonal direction with respect to the zone 1 731. Alternatively, the base station may additionally allocate a resource group in a zone where the number of terminals is smallest among the zones adjacent to the zone 1. The base station may identify that 24 terminals are located in the zone to which the resource group 2 is allocated among the zones adjacent to the zone 1, 30 terminals are located in the zone to which the resource group 3 is allocated, and 47 terminals are located in the zone to which the resource group 4 is allocated. Therefore, the base station may allocate the resource group 2 to the terminal. The resource group of the zone 4 having the smallest number of terminals among the zones may be allocated. Alternatively, the base station may additionally allocate the resource group of the zone where the number of terminals is smallest among the zones adjacent to the sector 730. 33 terminals are located in the zone to which the resource group 2 is allocated among the zones adjacent to the sector, 30 terminals are located in the zone to which the resource group 3 is allocated, and 35 terminals are located in the zone to which the resource group 4 is allocated. Therefore, the base station may additionally allocate the resource group 3 to the zone 1.

Alternatively, if the predetermined maximum value is 10 and there is no extra resource group, the base station may allocate resources so that the sector is again segmented like 740 and other resource groups are allocated to the adjacent zones.

B. An example in which the resource group is added in the zone 740. To the contrary, if the number of terminals existing in the sector is smaller than the number of supportable terminals (e.g., when the sector is configured of the zone including the number of terminals smaller than the predetermined minimum value $R_{min}$), the base station may update the virtual sector by merging adjacent zones and reallocate the resource group to use the same resource group in the merged zone. At this time, the method for merging zones may proceed in the following order.

① If the sum of the number of terminals existing in four zones included in a sector is equal to or greater than the predetermined minimum value $R_{min}$ and smaller than the predetermined maximum value $R_{max}$, the base station may consider that four zones existing in a section are merged to be one virtual zone.

② If the above condition is not satisfied, the number of terminals in adjacent zones in an x-axis direction included in the same sector may be identified. If $R_{min} \leq (N_i+N_{i+1}) < R_{max}$ (if I-th zone ID is an odd number) or if $R_{min} \leq (N_{i-1}+N_i) < R_{max}$ (if i-th zone ID is an even number), an i-th zone and an i+1-th zone may be merged.

③ If the above condition is not satisfied, the number of terminals in adjacent zones in a y-axis direction included in the same sector may be identified. If $R_{min} \leq (N_i+N_{i+Nx}) < R_{max}$ (if i-th zone ID belongs to an odd row) or if $R_{min} \leq (N_i+N_{i-Nx}) < R_{max}$ (if i-th zone ID belongs to an even column), an i-th zone and an i+1-th zone may be merged.

④ If the above condition is not satisfied, the current zone configuration may be maintained.

At this time, if the zones are merged, the base station may determine whether to use the resource group allocated to any of the zones. The base station may use the resource group allocated to the zone where the smallest number of terminals is located by adding the number of terminals located in the zone using the same resource group in the zones adjacent to the sector.

For example, referring to FIG. 7, it is assumed that the predetermined minimum value is 20 and the predetermined maximum value is 30. Since the sum of the number of terminals in adjacent zones in an x-axis direction in a first row is 31 and the sum of the numbers of terminals in adjacent zones in an x-axis direction in a second row is 31, the above conditions are not satisfied. Since the sum of the number of terminals in adjacent zones in a y-axis direction in a first column is 35, the above conditions are not satisfied. However, since the sum of the number of terminals in adjacent zones in a y-axis direction in a second column is 28, the above conditions are satisfied.

Therefore, the base station may merge the zone 2 and the zone 4, and may determine the resource group to be used in the merged zone. Specifically, since the number of terminals located in the zone to which the resource group 2 is allocated among the zones adjacent to the sector 730 is 33, the number of terminals located in the zone to which the resource group 4 is allocated is 35, the base station may allocate the resource group 2 to the merged.

In addition, if the number of terminals located in the merged zone increases due to the change of the situation information and thus an additional resource group is allocated, the method described in procedure No. 3 may be used. That is, if the number of extra resource groups held by the base station is larger than the number of zones in which the exceptional case occurs in the sector, the extra resource group may be allocated to the merged zone. If the number of extra resource groups held by the base station is smaller than the number of zones in which the exceptional case occurs in the sector, a resource group less affected by the interference among the resource groups allocated to the adjacent zone may be determined and additionally allocated. Here, in order to determine an appropriate resource group, a resource group in which an average value of the number of terminals included in the zone using the same transmission resource is smallest may be selected.

4. On the other hand, the terminal may transmit messages to another terminal by changing the transmission power according to the type of messages (or data) even in the same zone. The priority may be determined according to the type of messages, and the terminal may determine the transmission power according to the priority. In this manner, the probability of interference or congestion may be reduced by changing the transmission power and transmitting the message. That is, if the terminals do not transmit all the messages at the maximum transmission power and the transmission power is adjusted according to the type of messages, the interference probability may be additionally reduced.

Meanwhile, the base station may separately configure resource groups used in the idle state and the connected state. At least one resource group may be configured in the base station, and the base station may separately configure the resource group to be used for the terminal in the idle state and the resource group to be used for the terminal in the connected state. That is, the resource group for the terminal in at least the connected state may include the resource group for the terminal in the idle state, or may be configured as an independent resource group. In order to determine the resource group to be used for the terminal in the idle state and the resource group to be used for the terminal in the connected state, the base station may use the number of terminals in the idle state and the number of terminals in the connected state. In addition, if the number of terminals in the idle state and the number of terminals in the connected state change, the resource group may be redistributed.

For example, if the number of resource groups configured in the base station is 10, the number of resource groups to be used for the terminal in the idle state may be set to be two and the number of resource groups to be used for the terminal in the connected state may be set to be six. In such a case, there may be two extra resource groups.

However, if the number of terminals in the connected state increases sharply, the base station may change the number of resource groups to be used for the terminal in the idle state to one and the number of resource groups to be used for the terminal in the connected state to 7.

In this manner, the base station may determine the number of resource groups based on the number of terminals in the connected state.

In addition, the base station may set the reporting period of the Geo reporting reported by the terminals based on the situation information of the traffic environment such as the speed of the terminals acquired from the V2V infrastructures 721 to 724 and the size of the zone. For example, if it is determined by a sensor or a traffic camera that the speed of the terminals is fast, it means that the location of the terminals smoothly moves. Therefore, the base station may set the reporting period of the Geo reporting to be short. Similarly, since the situation within the zone is less changed when the size of the zone is large, the reporting period of the Geo reporting may be set to be longer than the case where the size of the zone is small.

Figure 8:
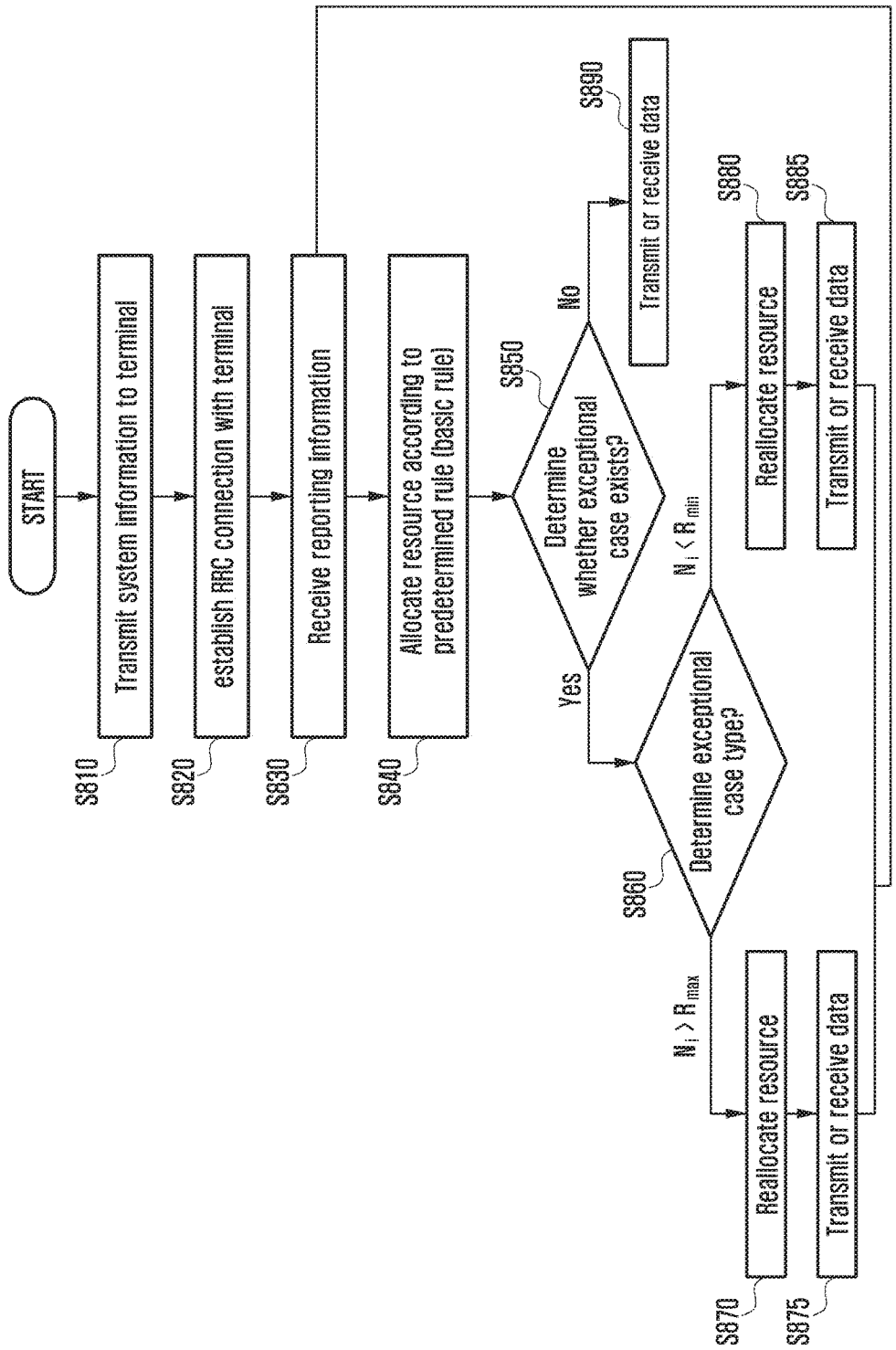
FIG. 8 is a diagram illustrating an operation of allocating, by a base station, resources according to an embodiment of the present disclosure.

FIG. 8 is a diagram illustrating an operation of allocating, by a base station, resources according to an embodiment of the present disclosure.

Referring to FIG. 8, the base station may transmit the system information to the terminal in operation S810. At this time, the system information may use SIB18 or a new SIB for V2V. The base station may transmit the information on the resource group for the idle terminal and the reporting configuration information to the terminal through the system information.

As described above, the base station may separately configure the resource group allocated to the terminal in the idle state and the terminal in the connected state. The base station may transmit information on the resource group for the idle terminal, and thus the idle terminal may map the location information to the resource group and use the location information. At this time, the resource group allocated to the terminal in the idle state and the terminal in the connected state may be determined based on the number of connected terminals and the number of idle terminals.

The reporting configuration information may include the size information of the zone, the number of zones, the reference coordinate information, and the like.

The base station may establish an RRC connection with the terminal in operation S820. The operation of establishing the RRC connection may be performed whenever the terminal attempts the RRC connection.

The base station establishing the RRC connection with the terminal may receive the Geo reporting from the terminal in operation S830. The Geo reporting may be transmitted through the RRC signaling or the MAC GE, Alternatively, the base station may receive control messages including the location information, such as the RRC signaling or MAC CE. The base station may periodically receive the Geo reporting or the control message including the location information, and the period during which the Geo reporting is received may be determined according to the reporting period information included in the reporting configuration information transmitted by the base station. At this time, the reporting period information may be determined based on the situation information including the speed of the terminal, the size of the zone, and the like.

The Geo reporting or the control message may include the zone ID, the GPS coordinate information, the timestamp, and the like.

The base station receiving the Geo reporting may allocate resources according to the predetermined rule (basic rule) in operation S840. The base station may allocate the resource group based on the received location information.

In addition, the base station may receive the situation information about the terminal's situation from the terminal and may allocate the resource group based on the location information and the situation information.

The base station may allocate different resource groups to the zones adjacent to the zone where the terminal is located among the resource groups configured in the base station in order to prevent the interference of the resource group between adjacent zones with respect to all the zones. Specifically, it is possible to set four resource groups to be repeated in one set, and to allocate four different resource groups to four adjacent zones. The detailed method is the same as the foregoing methods and therefore will be omitted below.

In operation S850, the base station may determine whether or not an exceptional case exists. The exceptional case may mean the case where the number of terminals in the corresponding zone is larger than the predetermined maximum value $R_{max}$ or smaller than the predetermined minimum value $R_{min}$. If the number of terminals located in the zone exceeds the predetermined maximum value, the resources in the resource group may not be allocated to all terminals, and if the number of terminals located in the zone is smaller than the predetermined minimum value, resources that are not used increase greatly, may mean that the resources are efficiently allocated.

In this manner, even when the resources are allocated according to the predetermined rule, the base station may determine whether or not the exceptional case exists in the corresponding zone to determine whether to introduce the correction algorithm.

If it is determined that there is an exceptional case, in operation S860, the base station may determine an exceptional case type. The base station may determine whether the resource group for supporting the terminal is insufficient in each zone (or whether the number of terminal located in each zone is larger than the predetermined maximum value, $N_i > R_{max}$), whether the number of terminals existing in a sector is smaller than the number of supportable terminals (or, whether the number of terminals located in the zone is smaller than the predetermined minimum value, $N_i > R_{min}$).

If the number of terminals located in the zone is larger than the predetermined maximum value (the resource group for supporting the terminal is lack in each zone existing in the sector), the base station may reallocate resources in operation S870. Specifically, in operation S870, the base station may separate the zones, reconfigure the sectors, and reallocate the resource groups according to the basic rules described above.

In addition, the base station may additionally allocate resources to the zone where the number of terminals is larger than the predetermined maximum value. Specifically, when the number of extra resource groups configured in the base station is larger than the number of zones exceeding the predetermined maximum value, the base station may allocate the additional resource group to the corresponding zone. That is, one resource group and an additional resource group that are basically allocated by separating the corresponding zone may be allocated. On the other hand, if the number of extra resource groups configured in the base station is smaller than the number of zones exceeding the predetermined maximum value, the base station may allocate the extra resource group in the order of the zone having the largest number of terminals and then add the resource group least affected by the interference to the remaining zones. The detailed content is the same as above and therefore will be omitted below.

On the other hand, if the number of terminals located in the zone is smaller than the predetermined minimum value (if the number of terminals existing in the sector is smaller than the number of supportable terminals), the base station may reallocate resources in operation S880. Specifically, the base station may reallocate the resource group after updating the virtual sector by merging the adjacent zones. That is, the base station may change the allocated resource group for the zone where the number of terminals is smaller than the predetermined minimum value.

The base station may merge the zones according to the predetermined method, and the specific method for merging zones is the same as described above. The base station may reallocate resources to use one resource group in the merged zone. At this time, the base station may reallocate the resource to use the resource group allocated to the zone least affected by the interference in the merged zone. The detailed method is the same as the foregoing methods and therefore will be omitted below.

If the resource group allocation algorithm is applied in the base station, in operation S875 and operation S885, the base station may transmit the corresponding resource group to the corresponding terminals, and the terminals may use the configured resource group to perform the V2V communication.

Meanwhile, as a result of the determination in operation S850, if the V2V communication is enabled by the resource allocated according to the basic rule initially established by the base station (i.e., if it is not the exceptional case), in operation S890, the terminals may perform the V2V communication using the configured resource group. At this time, the terminals may transmit messages or data using different transmission power depending on the type of messages or data to be transmitted.

Figure 9:
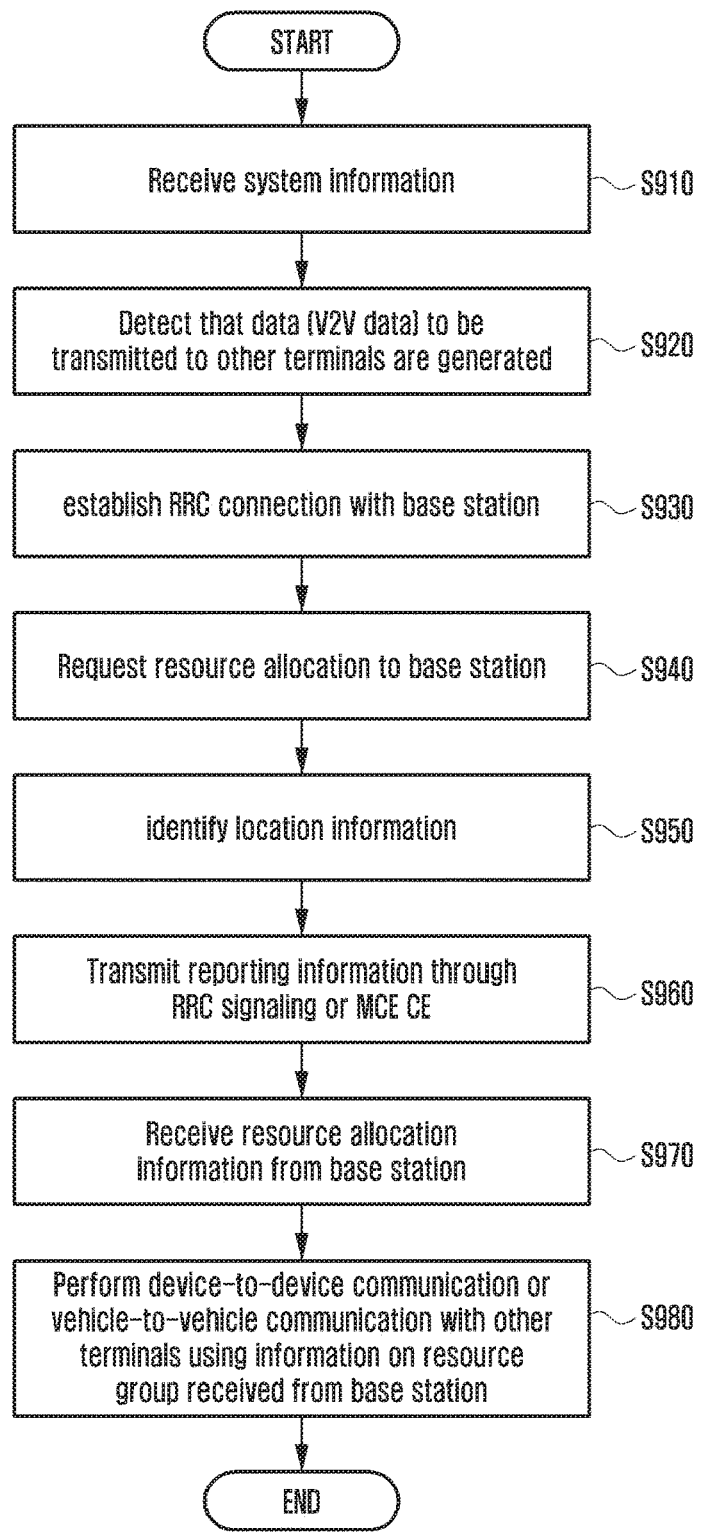
FIG. 9 is a diagram illustrating a method for a terminal according to an embodiment of the present disclosure.

FIG. 9 is a diagram illustrating a method of a terminal according to an embodiment of the present disclosure.

Referring to FIG. 9, after the terminal camps on the base station, the terminal may receive the system information in operation S910. The SIB for V2V may be included in the SIB, and the SIB for V2V may be used by extending the existing SIB18 or defining a new SIB for V2V. The terminal may receive the information on the resource group for the idle terminal and the reporting configuration information through the system information.

As described above, the base station may separately configure the resource group allocated to the terminal in the idle state and the terminal in the connected state, and the resource group allocated to the terminal in the idle state and the terminal in the connected state may be determined based on the number of terminals in the connected state and the number of terminals in the idle state.

Accordingly, the terminal may perform the D2D communication or the V2V communication using the resource group mapped to the location information of the terminal in the idle state.

In operation S920, the terminal may detect that data (V2V) to be transmitted to other terminals. If data to be transmitted to other terminals are generated, the terminal may RIRC-connected with the base station in operation S930. Alternatively, data to be transmitted to other terminals may be generated in the state in which the terminal is RRC-connected with the base station.

Thereafter, in operation S940, the terminal may request the resource allocation to the base station. Specifically, the terminal may transmit the resource allocation request message to the base station. The resource allocation request message may include a sidelink UE information message, in addition, the resource allocation request message may include the indicator for indicating the Geo reporting and the reporting period information of the location information.

In operation S950, the terminal may identify the location information. In addition, the terminal may generate the Geo reporting based on the identified location information. The terminal may identify the location information through the GPS and generate the Geo reporting including at least one of the GPS coordinate information, the index information of the zone, and the timestamp.

In operation S960, the terminal generating the Geo reporting may transmit the Geo reporting through the RRC signaling or the MCE CE. Alternatively, the terminal may transmit the location information to the base station without generating the Geo reporting, by including the location information in the control message such as the RRC signaling or the MCE CE.

The terminal may periodically transmit the Geo reporting or the control message using the reporting period information included in the reporting configuration information. At this time, the reporting period information may be determined based on the situation information including the speed of the terminal, the size of the zone, and the like.

As described above, the Geo reporting or the control message may include at least one of the GPS coordinate information, the index information of the zone, and the timestamp, and the base station may allocate the resources to the terminal using the information, in addition, the terminal may transmit the situation information about the terminal's situation and the base station may allocate the resources based on the location information and the situation information. The detailed content is the same as those described above and therefore will be omitted below.

Next, in operation S970, the terminal may receive the resource allocation information from the base station. The resource allocation information may include the information related to the resource group allocated to the terminal. That is, the resource allocation information may include information on a resource group different from the resource group allocated to the zone adjacent to the zone where the terminal is located, among the resource groups configured in the base station. In addition, the resource allocation information may include information on resources available in the resource group.

In addition, the resource allocation information may include the additionally allocated resource group information if the number of terminals in the zone where the terminal is located exceeds the predetermined maximum value, and if the number of terminals in the zone where the terminal is located is less than the predetermined minimum value, the allocated resource group may be changed. The detailed content is the same as those described above and therefore will be omitted below.

Accordingly, in operation S980, the terminal may perform the D2D communication or the V2V communication between other terminals using the information on the resource group received from the base station. At this time, the terminal may transmit messages using different transmission power according to the type of messages transmitted.

Figure 10:
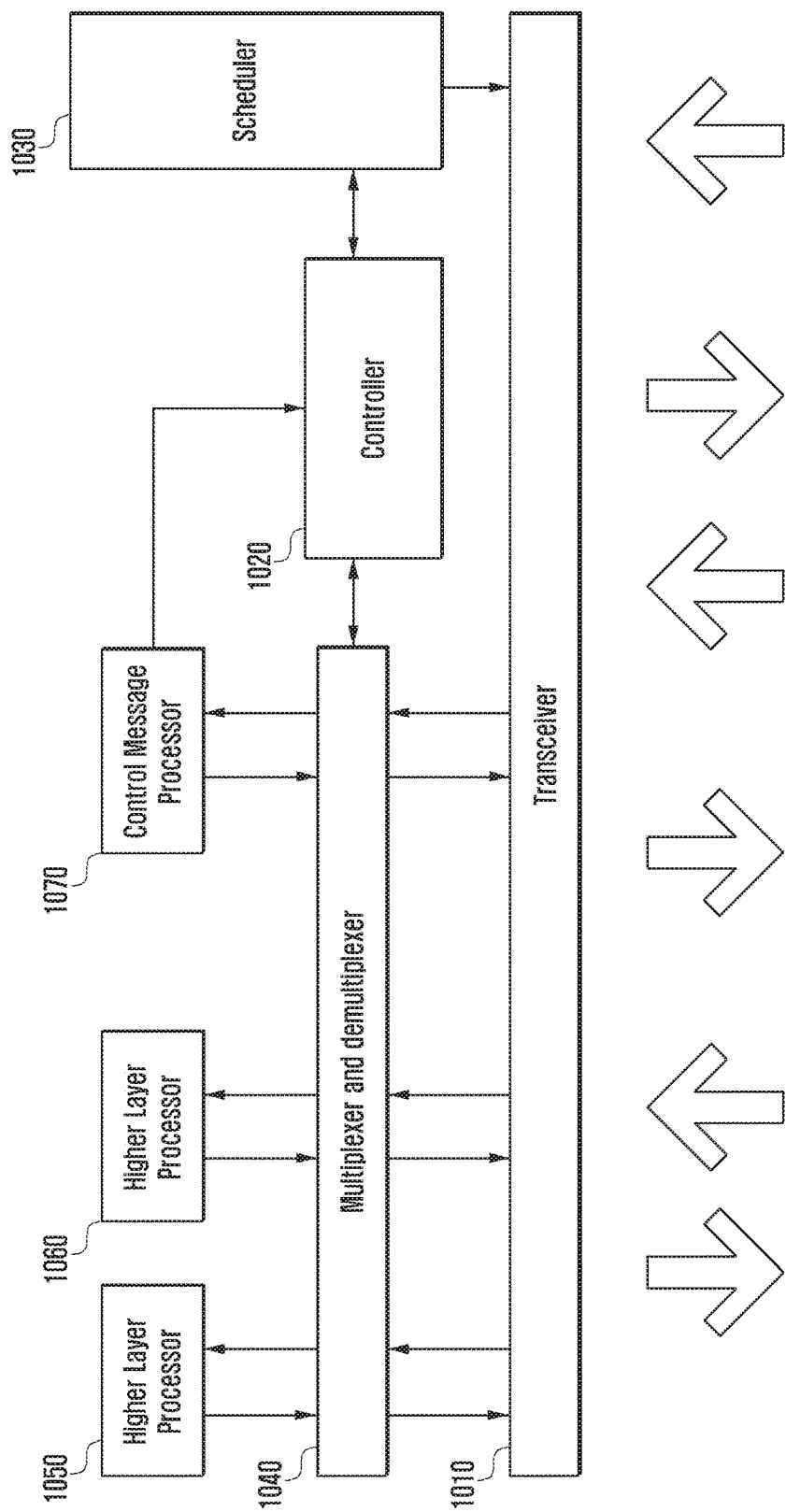
FIG. 10 is a block diagram illustrating a configuration of a base station according to an embodiment of the present disclosure.

FIG. 10 is a block diagram illustrating a configuration of a base station according to an embodiment of the present disclosure.

Referring to FIG. 10, the base station of the present disclosure may include a transceiver 1010, a controller 1020, a multiplexer/demultiplexer 1040, a control message processor 1040, various higher layer processors 1050 and 1060, and a scheduler 1030. For example, when defining a controller in the specification, it may be stated that "the controller may be a circuit, an application-specific integrated circuit or at least one processor."

The transceiver 1010 may transmit or receive signals. The transceiver 1010 may transmit data or a predetermined control signal through a forward carrier and receive the data and the predetermined control signal through a reverse carrier. If a plurality of carriers is configured, the transceiver 1010 may transmit/receive the data and the control signal through the plurality of carriers.

The multiplexer and demultiplexer 1040 may serve to multiplex data generated from the higher layer processors 1050 and 1060 or the control message processor 1070 or demultiplex data received by the transceiver 1010 and transmit the data to the appropriate higher layer processors 1050 and 1060, the control message processor 1070, or the processor 1020.

The control message processor 1070 may allow the terminal to process the control messages such as the transmitted RRC message and MAC CE to perform the required operation or may generate the control message to be transmitted to the terminal and transmit the generated control message to the lower layer.

The higher layer processors 1050 and 1060 may be configured for each terminal and each service and may process data generated from user services such as FTP and VoIP and transmit the processed data to the multiplexer and demultiplexer 1040 or process data transmitted from the multiplexer and demultiplexer 1040 and transmit the processed data to service applications of the higher layer.

The controller 1020 may manage a response operation to the request of the terminal and transmit it to the transceiver.

The controller 1020 may control the operation of the base station of the present disclosure, and the details thereof are as follows.

The controller 1020 may transmit the system information to the terminal. At this time, the system information may use SIB18 or a new SIB for V2V. The base station may transmit the information on the resource group for the idle terminal and the reporting configuration information to the terminal through the system information.

As described above, the base station may separately configure the resource group allocated to the terminal in the idle state and the terminal in the connected state. The base station may transmit information on the resource group for the idle terminal, and thus the idle terminal may map the location information to the resource group and use the location information. At this time, the resource group allocated to the terminal in the idle state and the terminal in the connected state may be determined based on the number of connected terminals and the number of idle terminals.

The reporting configuration information may include the size information of the zone, the number of zones, the reference coordinate information, and the like.

In addition, the controller 1020 may establish the RRC connection with the terminal. The operation of establishing the RRC connection may be performed whenever the terminal attempts the RRC connection.

Further, the controller 1020 may receive the Geo reporting from the terminal. The Geo reporting may be transmitted through the RRC signaling or the MAC CE. Alternatively, the controller 1020 may receive the control messages including the location information, such as the RRC signaling or MAC CE. Further, the base station may periodically receive the Geo reporting or the control message including the location information, and the period during which the Geo reporting is received may be determined according to the reporting period information included in the reporting configuration information transmitted by the base station. At this time, the reporting period information may be determined based on the situation information including the speed of the terminal, the size of the zone, and the like.

The Geo reporting or the control message may include the zone ID, the GPS coordinate information, the timestamp, and the like.

Further, the controller 1020 may allocate the resources according to the predetermined rule (basic rule).

In addition, the controller 1020 may receive the situation information about the terminal's situation from the terminal and may allocate the resource group based on the location information and the situation information.

The controller 1020 may allocate different resource groups to the zones adjacent to the zone where the terminal is located among the resource groups configured in the base station in order to prevent the interference of the resource group between adjacent zones with respect to all the zones. Specifically, it is possible to set four resource groups to be repeated in one set, and to allocate four different resource groups to four adjacent zones. The detailed method is the same as the foregoing methods and therefore will be omitted below.

The controller 1020 may determine whether or not the exceptional case exists. The exceptional case may mean the case where the number of terminals in the corresponding zone is larger than the predetermined maximum value $R_{max}$ or smaller than the predetermined minimum value $R_{min}$. If the number of terminals located in the zone exceeds the predetermined maximum value, the resources in the resource group may not be allocated to all terminals, and if the number of terminals located in the zone is smaller than the predetermined minimum value, resources that are not used increase greatly, which may mean that the resources are efficiently allocated.

In this manner, even when the resources are allocated according to the predetermined rule, the controller 1020 may determine whether or not the support is impossible in the corresponding zone to determine whether to introduce the correction algorithm.

If it is determined that there is an exceptional case, the controller 1020 may determine an exceptional type. The controller 1020 may determine whether the resource group for supporting the terminal is insufficient in each zone (or whether the number of terminal located in each zone is larger than the predetermined maximum value, $N_i > R_{max}$), whether the number of terminals existing in a sector is smaller than the number of supportable terminals (or, whether the number of terminals located in the zone is smaller than the predetermined minimum value, $N_i > R_{min}$).

If the number of terminals located in the zone is larger than the predetermined maximum value (the resource group for supporting the terminal is lack in each zone existing in the sector), the controller 1020 may reallocate resources. Specifically, the controller 1020 may separate the zones, reconfigure the sectors, and reallocate the resource groups according to the basic rules described above.

In addition, the controller 1020 may additionally allocate resources to the zone where the number of terminals is larger than the predetermined maximum value. Specifically, when the number of extra resource groups configured in the base station is larger than the number of zones exceeding the predetermined maximum value, the controller 1020 may allocate the additional resource group to the corresponding zone. That is, one resource group and an additional resource group that are basically allocated by separating the corresponding zone may be allocated. On the other hand, if the number of extra resource groups configured in the base station is smaller than the number of zones exceeding the predetermined maximum value, the controller 1020 may allocate the extra resource group in the order of the zone having the largest number of terminals and then add the resource group least affected by the interference to the remaining zones. The detailed content is the same as those described above and therefore will be omitted below.

On the other hand, if the number of terminals located in the zone is smaller than the predetermined minimum value (if the number of terminals existing in the sector is smaller than the number of supportable terminals), the controller 1020 may reallocate resources. Specifically, the controller 1020 may reallocate the resource group after updating the virtual sector by merging the adjacent zones. That is, the controller 1020 may change the allocated resource group for the zone where the number of terminals is smaller than the predetermined minimum value.

The controller 1020 may merge the zones according to the predetermined method, and the specific method for merging zones is the same as described above. The controller 1020 may reallocate resources to use one resource group in the merged zone. At this time, the controller 1020 may reallocate the resource to use the resource group allocated to the zone least affected by the interference in the merged zone. The detailed method is the same as the foregoing methods and therefore will be omitted below.

Accordingly, the controller 1020 may transmit the resource group to the corresponding terminals, and the terminals may perform the V2V communication using the configured resource group.

Meanwhile, if the V2V communication is enabled by the resource allocated according to the basic rule initially established by the base station (i.e., if it is not the exceptional case), the terminals may perform the V2V communication using the configured resource group.

At this time, the terminals may transmit messages or data using different transmission power depending on the type of messages or data to be transmitted.

The scheduler 1030 may allocate a transmission resource to the terminal at appropriate timing in consideration of the buffer status and the channel status of the terminal, an active time and a service request of the terminal, etc. and may allow the transceiver to process a signal transmitted from the terminal or perform a process to transmit a signal to the terminal.

Figure 11:
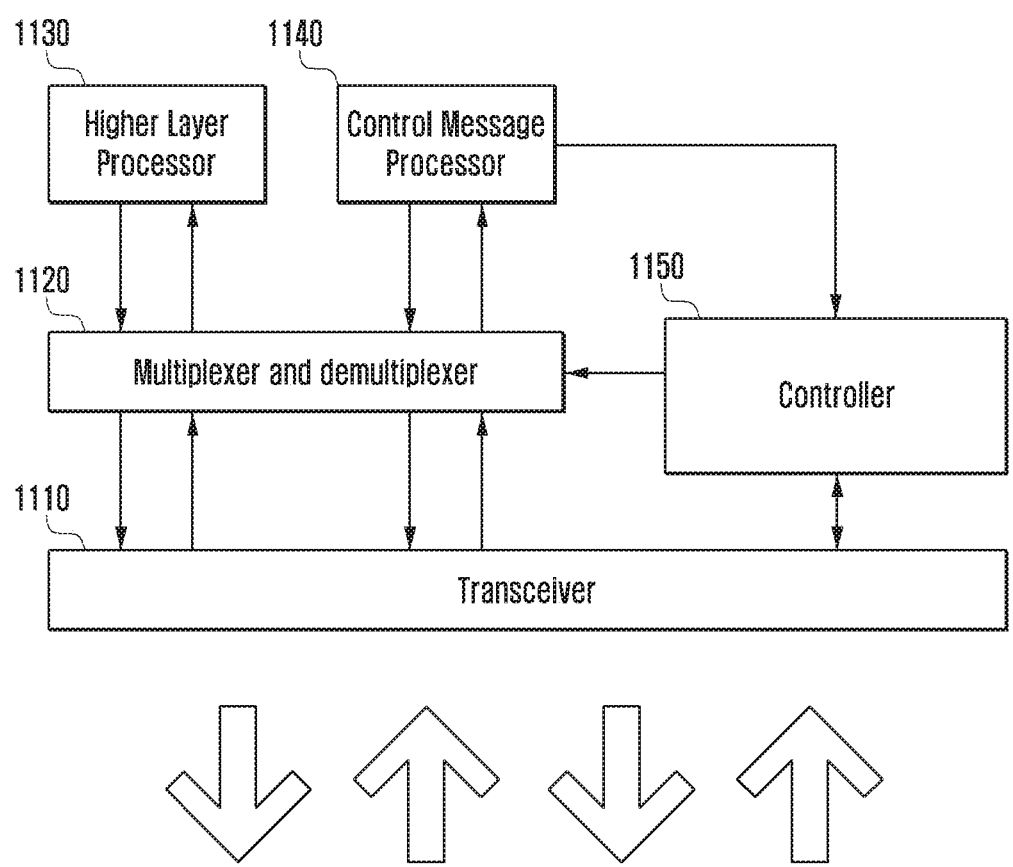
FIG. 11 is a block diagram illustrating a configuration of a terminal according to an embodiment of the present disclosure.

FIG. 11 is a block diagram illustrating a configuration of a terminal according to an embodiment of the present disclosure.

Referring to FIG. 11, the terminal may include a transceiver 1110, a demultiplexer 1120, a higher layer 1130, a control message processor 1140, and a controller 1150. For example, when defining a controller in the specification, it may be stated that "the controller may be a circuit, an application-specific integrated circuit or at least one processor."

The transceiver 1110 may transmit or receive signals. The terminal may transmit or receive data, or the like to or from the higher layer 1130 and transmit or receive the control messages to or from the base station through the control message processor 1140. It includes a function of processing the control messages such as the RRC message and the MAC CE. If the terminal transmits a control signal or data to the base station, the terminal may transmit data to other terminals through the transceiver 1110 after the multiplexer 1120 multiplexes the data under the control of the controller 1150.

The controller 1150 may control the operation of the terminal in the present disclosure.

The controller 1150 may receive the system information. The SIB for V2V may be included in the SIB, and the SIB for V2V may be used by extending the existing SIB18 or defining a new SIB for V2V. The controller 1150 may receive the information on the resource group for the idle terminal and the reporting configuration information through the system information. As described above, the base station may separately configure the resource group allocated to the terminal in the idle state and the terminal in the connected state, and the resource group allocated to the terminal in the idle state and the terminal in the connected state may be determined based on the number of terminals in the connected state and the number of terminals in the idle state.

Accordingly, the controller 1150 may perform the D2D communication or the V2V communication using the resource group mapped to the location information of the terminal in the idle state.

The controller 1150 may detect that data (V2V) to be transmitted to other terminals. If data to be transmitted to other terminals are generated, the controller 1150 may RRC-connected with the base station. Alternatively, data to be transmitted to other terminals may be generated in the state in which the terminal is RRC-connected with the base station.

The controller 1150 may request the resource allocation to the base station. The controller 1150 may transmit the resource allocation request message to the base station to request the resource allocation. The resource allocation request message may include a sidelink UE information message. In addition, the resource allocation request message may include the indicator for indicating the Geo reporting and the reporting period information of the location information.

Further, the controller 1150 may identify the location information. In addition, the controller 1150 may generate the Geo reporting based on the identified location information. The controller 1150 may identify the location information through the GPS and generate the Geo reporting including at least one of the GPS coordinate information, the index information of the zone, and timestamp.

The controller 1150 may transmit the Geo reporting through the RRC signaling or the MCE CE. Alternatively, the controller 1150 may transmit the location information to the base station without generating the Geo reporting, by including the location information in the control message such as the RRC signaling or the MCE CE. The controller 1150 may periodically transmit the Geo reporting using the reporting period information included in the reporting configuration information received from the base station. At this time, the reporting period information may be determined based on the situation information including the speed of the terminal, the size of the zone, and the like.

As described above, the Geo reporting may include at least one of the GPS coordinate information, the index information of the zone, and the timestamp, and the base station may allocate the resources to the terminal using the information. In addition, the controller 1150 may transmit the situation information about the terminal's situation and the base station may allocate the resources based on the location information and the situation information. The detailed content is the same as those described above and therefore will be omitted below.

The controller 1150 may receive the resource allocation information from the base station. The resource allocation information may include the information related to the resource group allocated to the terminal. That is, the resource allocation information may include information on a resource group different from the resource group allocated to the zone adjacent to the zone where the terminal is located, among the resource groups configured in the base station. In addition, the resource allocation information may include information on resources available in the resource group.

In addition, the resource allocation information may include the additionally allocated resource group information if the number of terminals in the zone where the terminal is located exceeds the predetermined maximum value, and if the number of terminals in the zone where the terminal is located is less than the predetermined minimum value, the allocated resource group may be changed. The detailed content is the same as those described above and therefore will be omitted below.

Accordingly, the controller 1150 may perform the D2D communication or the V2V communication between other terminals using the information on the resource group received from the base station. At this time, the controller 1150 may transmit messages using different transmission power according to the type of messages transmitted.

Meanwhile, it is described above that the terminal is configured of a plurality of blocks and each block performs different functions, which is only embodiment and therefore is not necessarily limited thereto. For example, the controller 1150 itself may also perform the function performed by the demultiplexer 1120.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include read-only memory (ROM), random-access memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

Meanwhile, although the various embodiments of the present disclosure have been illustrated in the present specification and the accompanying drawings and specific terms have been used, they are used in a general meaning in order to assist in the understanding the present disclosure and do not limit the scope of the present disclosure. It is obvious to those skilled in the art to which the present disclosure pertains that various modifications may be made without departing from the scope of the present disclosure, in addition to the various embodiments disclosed herein.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a base station, the method comprising:
   transmitting system information including information on resource groups;
   receiving, from a terminal, a resource allocation request;
   receiving, from the terminal, a control message including location information of a first zone where the terminal is located; and
   allocating at least one resource group among the resource groups based on the location information,
   wherein a number of the at least one resource group allocated to the terminal is determined based on a number of terminals in a connected state and a number of terminals in an idle state which are located in the first zone.

2. The method of claim 1, wherein the allocating comprises:
   receiving situation information associated with the terminal; and
   allocating the at least one resource group, which is different from a resource group allocated to a second zone adjacent to the first zone, among the resource groups, to the terminal based on the location information and the situation information,
   wherein the situation information includes at least one of information on a number of terminals located in the first zone or a size of the first zone.

3. The method of claim 2, wherein a reception period of the location information is determined based on the situation information, and
   wherein messages are transmitted on the at least one allocated resource group using a different transmission power according to a type of each of the messages.

4. The method of claim 1, wherein the allocating comprises:
   allocating at least two resource groups, in case that a number of terminals located in the first zone exceeds a predetermined maximum value; and
   changing a resource group mapped to the first zone in case that the number of terminals located in the first zone is less than a predetermined minimum value.

5. A method of a terminal, the method comprising:
   receiving system information including information on resource groups;
   transmitting, to a base station, a resource allocation request;
   transmitting, to the base station, a control message including location information of a first zone where the terminal is located; and
   receiving, from the base station, resource allocation information including at least one resource group, among the resource groups, allocated based on the location information,
   wherein a number of the at least one resource group allocated to the terminal is determined based on a number of terminals in a connected state and a number of terminals in an idle state which are located in the first zone.

6. The method of claim 5,
   wherein the transmitting comprises transmitting situation information associated with the terminal,
   wherein the at least one resource group, which is different from a resource group allocated to a second zone adjacent to the first zone, among the resource groups is allocated based on the location information and the situation information, and
   wherein the situation information includes at least one of information on a number of terminals located in the first zone or a size of the first zone.

7. The method of claim 6, wherein a reporting period of the location information is determined based on the situation information, and
   wherein messages are transmitted on the at least one allocated resource group using a different transmission power according to a type of each of the messages.

8. The method of claim 5,
   wherein the resource allocation information includes least two resource groups in case that a number of terminals located in the first zone exceeds a predetermined maximum value, and
   wherein a resource group mapped to the first zone is changed case that the number of terminals located in the first zone is less than a predetermined minimum value.

9. A base station comprising:
   a transceiver; and
   a controller coupled with the transceiver and configured to:
   transmit system information including information on resource groups, receive, from a terminal, a resource allocation request,
receive, from the terminal, a control message including location information of a first zone where the terminal is located, and
allocate at least one resource group among the resource groups based on the location information,
wherein a number of the at least one resource group allocated to the terminal is determined based on a number of terminals in a connected state and a number of terminals in an idle state which are located in the first zone.

10. The base station of claim 9, wherein the controller is further configured to:
receive situation information associated with the terminal, and
allocate the at least one resource group, which is different from a resource group allocated to a second zone adjacent to the first zone, among the resource groups to the terminal based on the location information and the situation information,
wherein the situation information includes at least one of information on a number of terminals located in the first zone or a size of the first zone.

11. The base station of claim 10,
wherein a reception period of the location information is determined based on the situation information, and
wherein messages are transmitted on the at least one allocated resource group using a different transmission power according to a type of each of the messages.

12. The base station of claim 9, wherein the controller is further configured to:
allocate at least two resource groups, in case that a number of terminals located in the first zone exceeds a predetermined maximum value, and
change a resource group mapped to the first zone in case that the number of terminals located in the first zone is less than a predetermined minimum value.

13. A terminal comprising:
a transceiver; and
a controller coupled with the transceiver and configured to:
receive system information including information on resource groups,
transmit, to a base station, a resource allocation request,
transmit, to the base station, a control message including location information of a first zone where the terminal is located, and
receive, from the base station, resource allocation information including at least one resource group, among the resource groups, allocated based on the location information,
wherein a number of the at least one resource group allocated to the terminal is determined based on a number of terminals in a connected state and a number of terminals in an idle state which are located in the first zone.

14. The terminal of claim 13,
wherein the controller is further configured to control to transmit situation information associated with the terminal,
wherein the at least one resource group, which is different from a resource group allocated to a second zone adjacent to the first, zone among the resource groups is allocated based on the location information and the situation information, and
wherein the situation information includes at least one of information on a number of terminals located in the first zone or a size of the first zone.

15. The terminal of claim 14,
wherein a reporting period of the location information is determined based on the situation information, and
wherein messages are transmitted on the at least one allocated resource group using a different transmission power according to a type of each of the messages.

16. The terminal of claim 13,
wherein the resource allocation information includes at least two resource groups in case that a number of terminals located in the first zone exceeds a predetermined maximum value, and
wherein a resource group mapped to the first zone is changed in case that the number of terminals located in the first zone is less than a predetermined minimum value.

* * * * *